US006976028B2

(12) United States Patent
Fenton et al.

(10) Patent No.: US 6,976,028 B2
(45) Date of Patent: Dec. 13, 2005

(54) MEDIA CONTENT CREATING AND PUBLISHING SYSTEM AND PROCESS

(75) Inventors: Nicholas W. Fenton, Los Angeles, CA (US); Michael F. Mannarino, Studio City, CA (US); Wendy Springer, Los Angeles, CA (US); Andrew Schneider, Los Angeles, CA (US); Marlowe J. Dayley, Los Angeles, CA (US); Alex Shmelev, Pacific Palisades, CA (US); Holly Thai, El Monte, CA (US); Jacob S. Manaster, Beverly Hills, CA (US); Rodney C. Newby, New York, NY (US); John Jeffrey Byer, Glendale, CA (US)

(73) Assignees: Sony Corporation, Tokyo (JP); Sony Pictures Entertainment, Inc., Culver City, CA (US)

( * ) Notice: Subject to any disclaimer, the term of this patent is extended or adjusted under 35 U.S.C. 154(b) by 208 days.

(21) Appl. No.: 09/906,024

(22) Filed: Jul. 13, 2001

(65) Prior Publication Data

US 2002/0194195 A1 Dec. 19, 2002

Related U.S. Application Data

(60) Provisional application No. 60/298,372, filed on Jun. 15, 2001.

(51) Int. Cl.[7] ............................................. G06F 17/00
(52) U.S. Cl. ....................................... 707/102; 715/762
(58) Field of Search .............................. 707/104.1, 102;
719/217, 218, 219, 310, 331; 345/748, 749;
715/700, 762, 748, 749, 764, 765, 810; 709/217,
709/218, 219

(56) References Cited

U.S. PATENT DOCUMENTS

| | | | |
|---|---|---|---|
| 6,308,188 B1 * | 10/2001 | Bernardo et al. | ........... 715/530 |
| 6,311,194 B1 | 10/2001 | Sheth et al. | |
| 6,345,256 B1 | 2/2002 | Milsted et al. | |
| 6,370,562 B2 | 4/2002 | Page et al. | |

(Continued)

OTHER PUBLICATIONS

Product Description pages for Sound Forge XP Studio 5.0 from website of Sonic Foundry (http://www.sonicfoundry.com); Nov. 13, 2001.

(Continued)

*Primary Examiner*—Uyen Le
(74) *Attorney, Agent, or Firm*—Frommer Lawrence & Haug LLP; William S. Frommer; Samuel S. Lee

(57) ABSTRACT

A system and process for creating, editing, uploading, storing, sharing, and publishing media content. The system and process occurs within an online environment including one or more user network devices and one or more server network devices connected by a communications link to the one or more user network-enabled devices. The process includes providing access to digital assets and media creating and editing tools via a website. A website user may incorporate the digital assets into media content created or edited by the user by utilizing the media creating and editing tools. The user may then upload an store this personalized media content to storage space provided to the user by the website. The user may also "publish" this personalized media content to a user showcase page on the website. Users may share their personalized media content with other users via a share page on the website.

95 Claims, 18 Drawing Sheets

U.S. PATENT DOCUMENTS

| | | |
|---|---|---|
| 6,484,199 B2 * | 11/2002 | Eyal ............................ 709/223 |
| 6,654,029 B1 * | 11/2003 | Chiu et al. .................. 345/717 |
| 2002/0032019 A1 * | 3/2002 | Marks et al. ................ 455/414 |
| 2002/0052885 A1 | 5/2002 | Levy |
| 2002/0059120 A1 | 5/2002 | Milton |
| 2002/0083006 A1 | 6/2002 | Headings et al. |
| 2002/0091725 A1 * | 7/2002 | Skok ........................ 707/501.1 |
| 2002/0091792 A1 | 7/2002 | Janniello et al. |
| 2002/0129052 A1 * | 9/2002 | Glazer et al. ............. 707/501.1 |
| 2002/0192630 A1 * | 12/2002 | Sirhall ........................ 434/350 |
| 2003/0126210 A1 * | 7/2003 | Boys ........................... 709/204 |
| 2003/0191816 A1 * | 10/2003 | Landress et al. ............ 709/219 |

OTHER PUBLICATIONS

Product Description pages for Sound Forge 5.0 from website of Sonic Foundry (http://www.sonicfoundry.com); Nov. 13, 2001.

PCT International Search Report as issued in International Application No. PCT/US02/15822, Mailing Date Aug. 2, 2002.

PCT International Search Report as issued in International Application No. PCT/US02/15792, Mailing Date Sep. 3, 2002.

* cited by examiner

Details about your file.

<Title of Asset> ~1102

*Author/Artist: ~1104

*Description: ~1106
*maximum 175 characters*

Credits: ~1108
*maximum 255 characters*

Keywords: ~1110
*separate with commas*
*maximum 60 characters*

*Feature Type: ~1112

*Feature Sub-type: ~1114

*Genre: ~1116

*Sub-genre: ~1118

*required field*

Submit ~1120    Cancel ~1122

FIG. 12

MEDIA CONTENT CREATING AND PUBLISHING SYSTEM AND PROCESS

RELATED APPLICATIONS

This application claims priority to Provisional Application No. 60/298,372, filed Jun. 15, 2001, which is hereby incorporated by reference. The present application also relates to a co-pending U.S. utility patent application entitled "Content Management System and Process," Ser. No. 09/906,023, filed Jul. 13, 2001, the content of which is also incorporated by reference herein.

BACKGROUND OF THE INVENTION

1. Field of the Invention

The present invention relates generally to systems and processes for on-line publishing of media content, and more particularly to a broadband creativity platform for creating, editing, sharing and publishing of media content online.

2. Description of Related Art

Advances in digital multimedia creation and editing technologies have made available to a wider group of people the tools to generate their own video, audio, and graphic creations on their home computer. Many creation and editing tools are available on the market that allow a non-professional user to perform various creative and editing tasks once restricted to media professionals working with high-end equipment in facilities that specialize in media effects.

The growing interest in creating and editing personalized content in a professional, as well as a non-professional setting has increased the demand for software tools for developing video, audio, and graphic creations. However, the creative user may find that access to such tools can be cost prohibitive, as well as requiring a large investment of the user's time to become proficient in their use. Although the user may have a desire to create, the limited access to such tools, as well as the investment of time required in learning how to use the various tools, may deter many users from satisfying this desire.

A further obstacle to satisfying this desire to create is the usually limited audience available to appreciate the non-professional user's creations. After investing the time to learn how to create and edit their own content, the non-professional user will generally, at most, e-mail a copy of their creations to a few friends. Although the user may be very talented, only a very small group of people are able to appreciate that talent.

Therefore, it can be seen that there is a need for a user-friendly media content creation and editing system and process. Furthermore, it can be seen that there is a need for a media content sharing and publishing system and process whereby users can easily display their media content to a wider audience, as well as making their media content available for sharing by other users.

SUMMARY OF THE DISCLOSURE

Embodiments of the present invention overcome problems in the existing art as described above by providing a media content creating and publishing system and process.

Embodiments of the invention may operate within an online environment including one or more user network devices and one or more server network devices connected by a communications link to the one or more user network devices.

Further embodiments of the present invention provide a broadband creativity platform accessible to users through the communications link that provides media creating and editing tools that the user may access and download in order to create and edit their own media content items.

Further embodiments of the present invention further provide a broadband creativity platform accessible to users through the communications link that provides digital assets that users may incorporate into their own media content items.

Further embodiments of the present invention further provide a broadband creativity platform accessible to users through the communications link that provides a storage area for storing user-created media content items.

Further embodiments of the present invention further provide a broadband creativity platform accessible to users through the communications link that provides tools for storing and managing media content items.

Further embodiments of the present invention further provide a broadband creativity platform accessible to users through the communications link that provides tools for sharing media content items between users.

Further embodiments of the present invention further provide a broadband creativity platform accessible to users through the communications link that provides tools for configuring and managing user display pages for displaying media content items.

In one embodiment, the broadband creativity platform is implemented as a website accessible to the user through a web browser which displays to the user a number of web pages and other programmed elements which facilitate the media content creating and publishing process by allowing the user to create and edit media content items, store the media content items in a user storage area, manage the media content items within the user storage area, share media content items with other users, and configure and manage user showcase pages to display the user's media content items.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

Referring now to the drawings in which like reference numbers represent corresponding parts throughout:

FIG. 11 shows an exemplary "Details About Your File" pop-up window, according to an embodiment of the invention;

FIG. 12 illustrates an exemplary manage share page, according to an embodiment of the invention;

DETAILED DESCRIPTION OF EMBODIMENTS OF THE INVENTION

Figure 1:
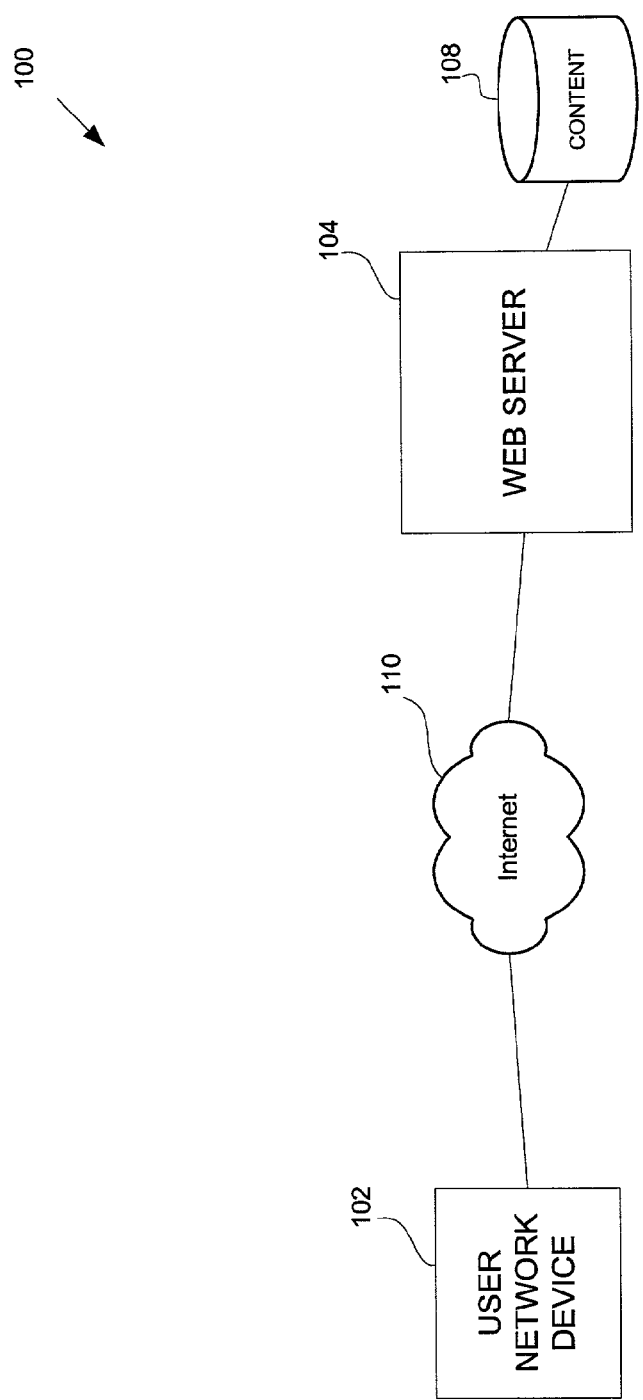
FIG. 1 is a simplified view of an exemplary client-server environment in which a system and process according to embodiments of the invention may be employed.

In the following description of embodiments of the invention, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Embodiments of the present invention relate to a media content creating and publishing system and process for creating, editing, sharing, and publishing media content items, and in example embodiments, to a broadband creativity platform for creating, editing, sharing, and publishing of media content items online. In example embodiments, the broadband creativity platform is implemented as a website on which users are provided with digital assets and tools required for on-line and off-line creating and editing of media content items, as well as tools for sharing media content items between users, and for online publishing of media content items. The term "digital assets" is used herein to refer to media content made available for use by a website user in the user's own media creations. The terms "media content" and "media content item" are used herein to refer to all forms of electronic content (i.e., content that may be read or processed in an electronic form), including, but not limited to, digital video, audio, photos, graphics, text and animation.

Embodiments of the broadband creativity platform's website provide one or more functions including, but not limited to: (1) allowing a user of the website to experience creative media content licensed from independent sources, as well as content that has been created by users of the platform; (2) allowing a user of the platform to access media creation and editing tools in order to create and edit, either on-line or off-line, content such as, but not limited to, video and audio segments; (3) allowing a user to upload user-created content to the platform; (4) allowing a user to store and manage the media content in storage space provided by the platform; (5) allowing a user to share media content with other users of the website; (6) allowing a user to display user content on a showcase page assigned to the user and viewable by other users of the platform; and (7) allowing user-created content to be selectively ingested into the main display pages of the platform.

An embodiment of the system and process employs a network of computer systems. The components of the network may be interconnected across a wide area network, such as, but not limited to, the Internet. At the top level, server network devices ("servers") support the operation of the broadband creativity platform and store digital assets and other media content that may be accessed by users of the platform. The digital assets and other media content may be licensed from independent providers by the website or owned by the website. The servers also reserve storage space for user-created content that may be created and uploaded by the user to the platform.

The main website may contain a homepage and a tree of numerous additional web pages inter-linked with the homepage at the root. The pages of the website may be of various types, such as, but not limited to user settings pages, user profile pages, user showcase pages, user biography ("bio") pages, channel (genre) pages, and zone pages. Users may also activate, view, and utilize the functionality of pop-up screens ("poppers") within pages including, but not limited to, audio poppers, video poppers, and tool poppers. The user may browse through the website by following links within the pages of the website or by using various tools, such as, but not limited to, a search tool, a graphic guide to media content on the platform, user selectable operators such as virtual buttons (designated selectable icons or areas) and menus, lists, and the like.

All media content items on the site, from whatever source, may be associated with "meta-data" (i.e., descriptive data regarding the media content items that may be entered by the user or website administrators), which may be used to organize and manage the media content items. Media content search and guide functions may be implemented using this meta-data. The user can search for media content items on the website based on certain criteria, such as, but not limited to, media content item type, media content item keywords, and the media content item creator.

The website's homepage contains links to other pages on the website. Users may manage favorite links by accessing, adding and deleting favorite links. In one embodiment, the homepage may contain user-selectable operators for selecting a desired functionality. The homepage may also contain user-selectable promotional areas ("promotes") which are linked to the promoted page, popper, advertisement, website, or other promoted entity.

Systems and processes according to example embodiments of the present invention may be employed on a website on which digital assets and tools are made available to users of the website who have registered and logged on to the website. In one embodiment, users will subscribe (for example, pay a fee) in order to obtain access to the digital assets and tools that are available. In other embodiments, scaled-down versions of digital assets and tools may be made available to the registered or unregistered users of the website at no charge. Full-versions of these tools may be purchased or leased from the website for a fee.

In some embodiments, media creation and editing tools may be accessed and downloaded by the user for on-line or off-line creation and editing of the user's own media content items. Media content items created by website users may be uploaded to the website and stored in a storage area made available to users. These stored media content items may be managed by the user in various ways, such as, but not limited to, defining, sorting, searching, sharing, and deleting the stored media content items.

The website may also provide to the user a "showcase page" on which to display this content to other users of the platform in templates with pre-defined styles. The showcase page may be viewable by other users of the platform. The showcase page may be linked to a user "biography page" where the user may display personal and other information to other users. If media content items displayed on a user's showcase page are particularly compelling, website administrators may choose to "ingest" those media content items into the main display pages of the website, using administrative tools not accessible to the user. These administrative tools facilitate administration of the website by website administrators and programmers.

In one embodiment, the homepage contains user-selectable operators which provide to the user the choice of "experiencing," "creating," or "connecting" media content on the website. Depending on the user's purpose, the user may choose one of these three operators.

When a user chooses to "experience" media content, the user may experience (i.e., view, hear, or otherwise perceive) media content licensed from independent sources, as well as media content that has been created by users of the website. In one embodiment, when the user chooses to experience media content, the user may be presented with a further choice between various user-selectable operators, each linked to a particular channel home page. A channel home page may be the main page on which a particular genre of media content (for example, comedy, drama, action, science fiction, horror, or music) is presented. This main page contains promotes that link to other pages or present media content to the user.

When a user chooses to "create" media content, the user may be provided access to media creation and editing tools to create and/or edit media content. The user may also be provided with digital assets in the form of one or more "asset packs." These asset packs may contain, for example, video, audio, and animation segments that may be incorporated into or combined with the user's own media content. For example, each asset pack may comprise audio and video segments related to a particular genre. As an example, an "action" asset pack may comprise video and/or audio segments of explosions, car chases, and gun battles. Similarly, a "comedy" asset pack may comprise video and/or audio segments of stand-up comedians, skits from television and radio shows, and scenes from comedy films. As an additional example, a "music" asset pack may contain video and/or audio segments of music being played by popular musical groups. Using media creation and editing tools, the user may then insert this video, animation, audio and other digital media into, for example, pre-defined templates and timelines.

The channel home pages may comprise user-selectable operators that link to digital assets associated with the genre on that channel home page. Thus, for example, the user can experience the action channel home page and then select a create user-selectable operator on that page which will link the user to an action asset pack. As discussed above, the action asset pack may contain, for example, video, audio, and animation segments of action scenes, including, but not limited to, explosions, car chases, and fight scenes. The user may then use the action segments in the user's own creations. As an example, the user may have video showing a child falling off a bike. The user may insert a video segment of an explosion obtained from the website at the point in the user's video where the child falls. The user may then display this video on the user's own user showcase page on the website, as discussed below.

When a user chooses to "connect" media content, the user may, for example, be presented with an upload page or popper wherein the user may enter information about the media content (meta-data). The media content may then be uploaded to the user's showcase page on the website. The user showcase page may be accessed, in one embodiment, by entering the website's Uniform Resource Locator ("URL") followed by /"USERNAME," where "USERNAME" is a name unique to the user associated with the showcase page. A particular user's showcase page may then be accessible to other users of the website who enter that user's user name after the website's URL. Thus, the user may connect with other users of the website by having a showcase page on which to display the user's creative media content and by being able to search for and access other user's showcase pages.

System Hardware Environment

FIG. 1 is a simplified view of an exemplary client-server environment 100, such as the World Wide Web (the Web), in which the media content creating and publishing system and process may be implemented. The architecture of the Web follows a conventional client-server model. The terms "client" and "server" are used to refer to a computer's general role as a submitter of requests for data (the client) or provider of data (the server). The client, also referred to as User Network Device ("UND") 102, and Web server 104 communicate using a protocol such as HyperText Transfer Protocol (HTTP). In the Web environment, Web browsers reside on clients and render Web documents (pages) served by the Web servers. The client-server model is used to communicate information between UND 102 and Web server 104.

Web server 104 is coupled to a network 110, for example the Internet, and responds to document requests and/or other queries from Web clients. Other embodiments may employ other networks. While the actual sequence of events and operation of the main pages of the website vary with different embodiments, in one example embodiment a user first connects to the website using a web-browser, such as Netscape Navigator or Internet Explorer. The user may then log into the website with a user identifier and password or may log in as a guest. A new user may also register with the website to establish a user identifier and password. During the login process and registration, the main website may derive information about the user's processor or computer system to provide proper support for the user's interaction (for example, to determine the optimum bandwidth to use). When a user selects a document by submitting its URL, the Web browser opens a connection to Web server 104 and initiates a request (e.g., an HTTP get) for the document. Web server 104 delivers the requested document, typically in the form of a text document coded in a standard markup language such as HyperText Markup Language (HTML) or Dynamic HTML (DHTML). Additionally, website pages may be coded in Java, JavaScript, Flash, or any other suitable programming or scripting language.

UND 102 may be any type of computing device such as, but not limited to, desktop computers, workstations, laptops, and/or mainframe computers. Additional variations may also be implemented such as interfaces for wireless telephones, PDAs, media players, and for satellite download capability. One or more users (not shown) may be associated with each UND 102.

The UND 102 may also include software, hardware, firmware or combinations thereof, for converting digital content into user-perceptible media content. When a UND 102 is connected in communication with the server 104, the website may be displayed on the user's device as a user interface for allowing a user to receive user-perceptible information from the server 104 and communicate information to the server 104, including, but not limited to, requests for media content downloads, uploads, or requests to link to additional pages, poppers or other websites.

Web server 104 may also be any type of computing device such as, but not limited to, desktop computers, work stations, laptops, and/or main frame computers. In website embodiments, the server 104 may include or operate with a memory system 108 for storing website content, comprising data for creating or generating text, images, designs or other indicia that compose one or more website elements, including, but not limited to, showcase pages, user biography pages, "channel (genre) pages", "zone pages," and poppers.

System and device functions and processes described herein may be implemented with machine-executable instructions. Software comprising these instructions may be used to program and cause general-purpose or special-purpose processors to perform the functions and processes described herein. Alternatively, such functions and processes may be implemented by firmware, hardware comprising hardwired logic, or by any combination thereof.

In one example embodiment, users may be provided with computer program products comprising a machine-readable medium storing software for programming a computer (or other UND as described above) to perform processes carried out by the UND relating to the creating, editing, sharing, and publishing of media content items, according to the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

In another example embodiment, UNDs are programmed with software downloaded to the UNDs as computer program products. The software, for example, media creating and editing tools, may be downloaded or transferred from a remote processor (for example, a server) to a requesting processor (for example, a UND) by way of data signals embodied in a carrier wave or other propagation medium via a communication link (for example, a modem or other wired or wireless network connection, a satellite signal receiver or other broadcast signal receiver, or the like).

Media Content Creating and Editing Process

The user may connect to the website across the Internet, using UND 102. In one embodiment, UND 102 may employ standard Web-browsing software to connect to and interact with the website. In other embodiments, customized software, hardware, firmware or combinations thereof, may be employed by UND 102 for interacting with server 104. The user may connect to the website by, for example, connecting to the address or URL associated with the website.

Figure 2:
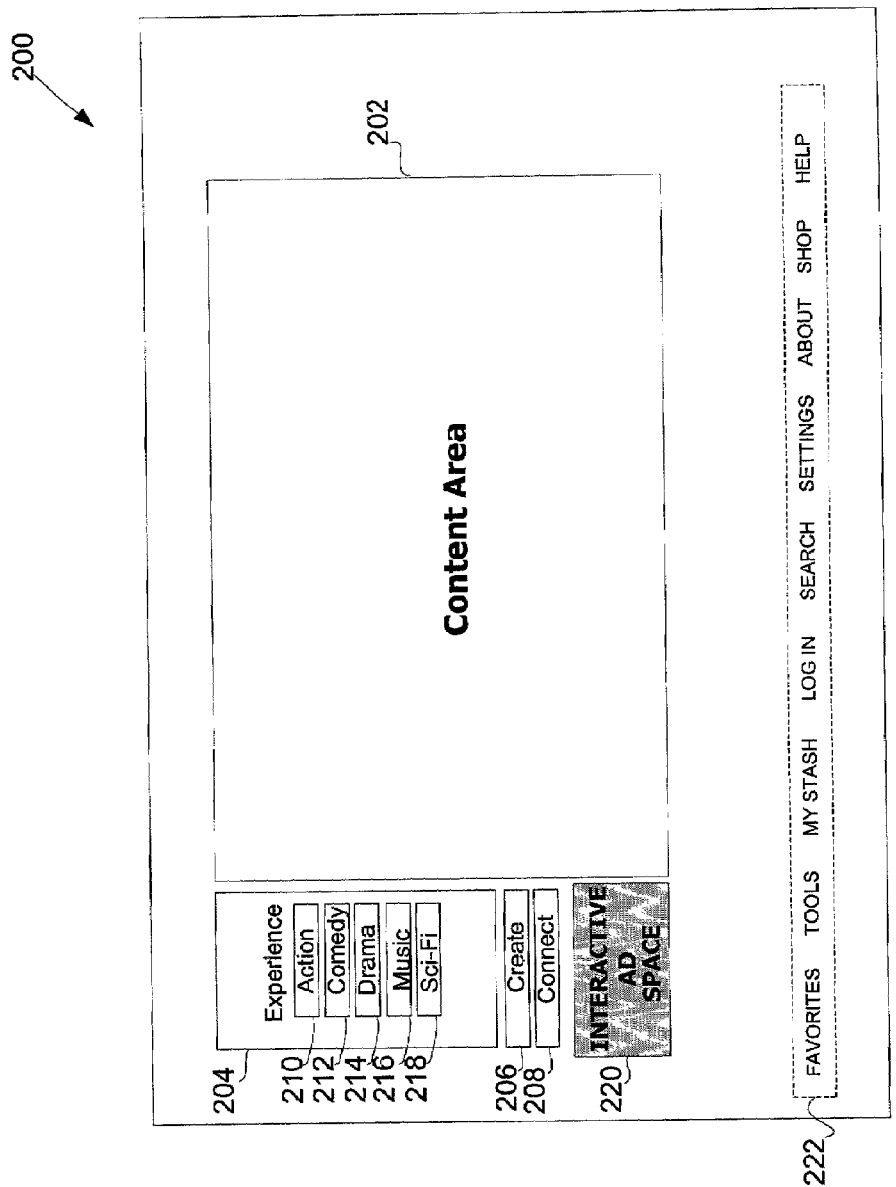
FIG. 2 shows an exemplary website homepage, according to an embodiment of the invention.

According to one embodiment, when a user has connected to the address or URL associated with the website, the user may be presented with the website homepage 200, as shown in FIG. 2. In some embodiments, under certain conditions, the user will be required to register and log in to the website before reaching the homepage. The website homepage (as well as other pages to be described) may allow the user to experience, create, and connect media content.

The website content, as well the arrangement of website content on the website pages, may vary depending upon the embodiment. Exemplary website homepage 200 comprises content area 202, "experience" channel area 204 (comprising user-selectable operators 210 (action), 212 (comedy), 214 (drama), 216 (music), and 218 (science fiction) for selecting a genre of media content), a "create" user-selectable operator 206, a "connect" user-selectable operator 208, interactive advertising space 220, and menu area 222.

Content area 202 may comprise media content items including, but not limited to, video segments, stills, photos, animation, and graphics. Content area 202 may also comprise promotes which may link the user to, for example, other pages or poppers within the website, in addition to linking the user to other websites. Menu area 222 comprises menu items that expand when being clicked by a mouse, or otherwise being selected by a user, to show additional functions from which the user may choose.

Interactive advertising space 220 may display to the user advertisements for companies, services and products. The interactive advertising space 220 may comprise a broadband advertising unit that slides on-screen and off-screen at pre-determined intervals and/or may be made to appear on-screen through some action of the user, for example, by clicking or otherwise selecting tabs that may be displayed along the periphery of the screen.

The menu area 222 may comprise menu choices including, but not limited to, "favorites" (a link to areas, pages, or media content items that are of interest to the user and that the user has previously designated as favorites), "My Stash" (a link to media content that the user has previously saved to a storage area ("stash") provided to the user by the website), "Log in" (links to a log in page so that the user may log into the website), "search" (links to a search page so that the user may perform searches based on user-defined criteria), "settings" (links to a settings page so that the user may enter and edit settings such as the user's password and user name), "about" (links to about pages that provide the user with information about the website), and "shop" (links to shopping pages on which the user may purchase merchandise offered by the website or by independent vendors).

Figure 3:
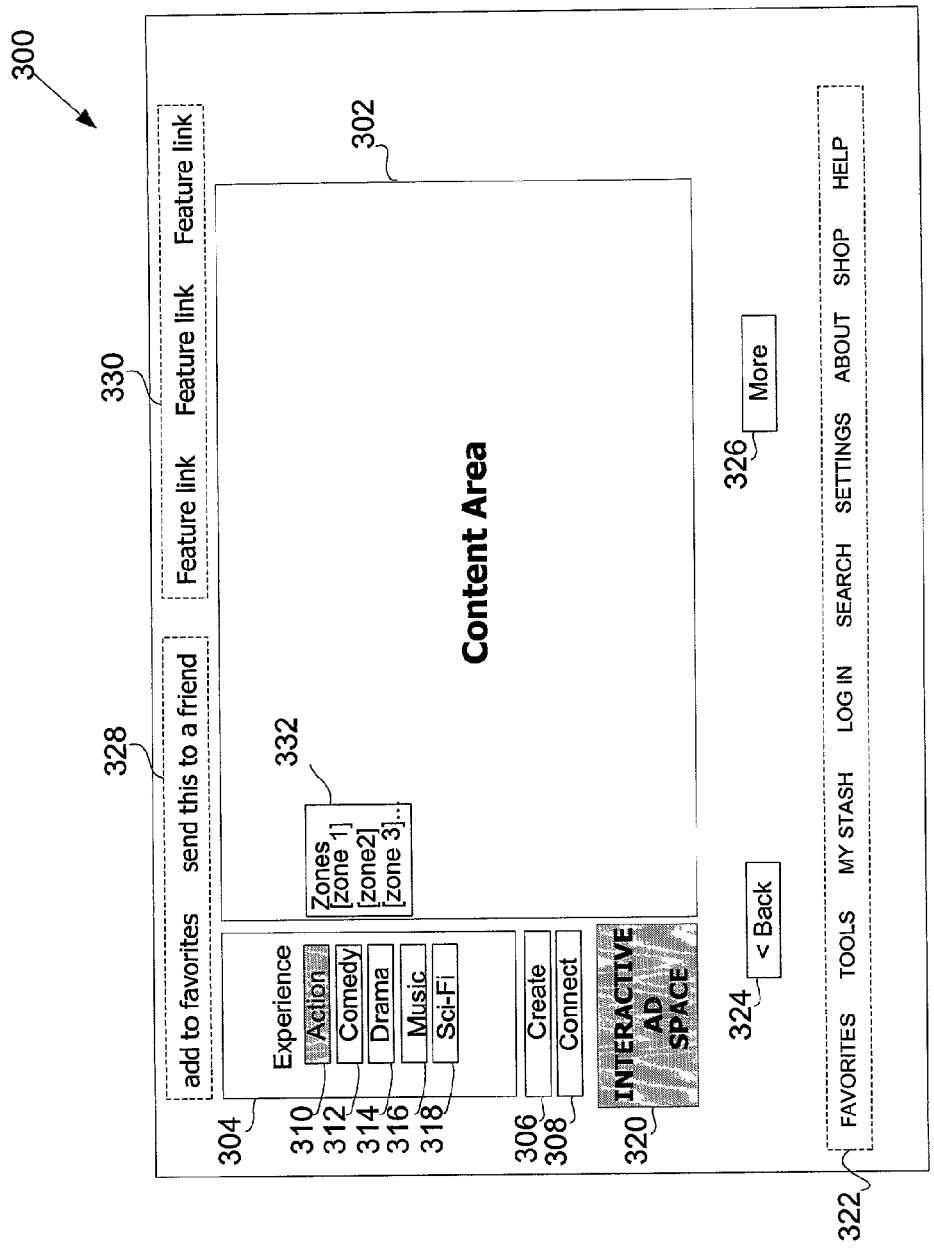
FIG. 3 shows an exemplary action channel home page, according to an embodiment of the invention.

When a user clicks or otherwise selects a user-selectable operator in experience channel area 204, the user will be linked to a channel page corresponding to the selected user-selectable operator. For example, if the user selects the "action" user-selectable operator, the user may be taken to an action channel home page 300, as shown in FIG. 3.

Similarly to exemplary home page 200, exemplary action channel home page 300 comprises content area 302, "experience" channel area 304 (comprising user-selectable operators 310 (action), 312 (comedy), 314 (drama), 316 (music), and 318 (science fiction) for selecting a genre of media content), a "create" user-selectable operator 306, a "connect" user-selectable operator 308, interactive advertising space 320, and menu area 322.

Content area 302 may comprise media content related to the action genre. For example, there may be an action video segment visible in content area 302. Alternatively, or in addition, there may be promotes in content area 302, including, but not limited to, promotes linking the user to action digital asset packs that the user may download and edit for use within user-created media content. Content area 302 may also comprise promotes linking the user to other websites with action themes or to other pages within the website on which the user may shop for action-related merchandise.

Interactive advertising space 320 and menu area 322 may provide the same functionality as that described above for home page 200. Channel home page 300 may further comprise additional user-selectable operators such as the "back" user-selectable operator 324 and "more" user-selectable operator 326. The back operator allows the user to easily navigate back to previously viewed pages. The more operator may link the user to a website graphical guide which may display to the user media content available on the website that may be related to the genre of the particular channel home page.

Channel home page 300 may further comprise user-selectable menu 328 which allows the user to add channel home page 300 to the user's favorites list and send a link to channel home page 300 to a friend. In addition, channel home page 300 may comprise feature links 330 which may be in the form of, for example, promotional images or text and may link the user to, for example, additional action related pages, poppers, or websites.

In some embodiments, when a user rolls over (for example, with the mouse cursor) a genre user-selectable operator, the user may be presented with a list of genre zone pages that may be clicked or otherwise selected by the user. The genre zone pages may be particular shows or other events available to the user which correspond to the particular genre, for example, action shows. List 332 is an example of such a genre zone page list. List 332 may be displayed to the user when the user rolls over the action user-selectable operator 310 in experience area 304 and may comprise three action-related shows that the user may choose to experience.

Figure 4:
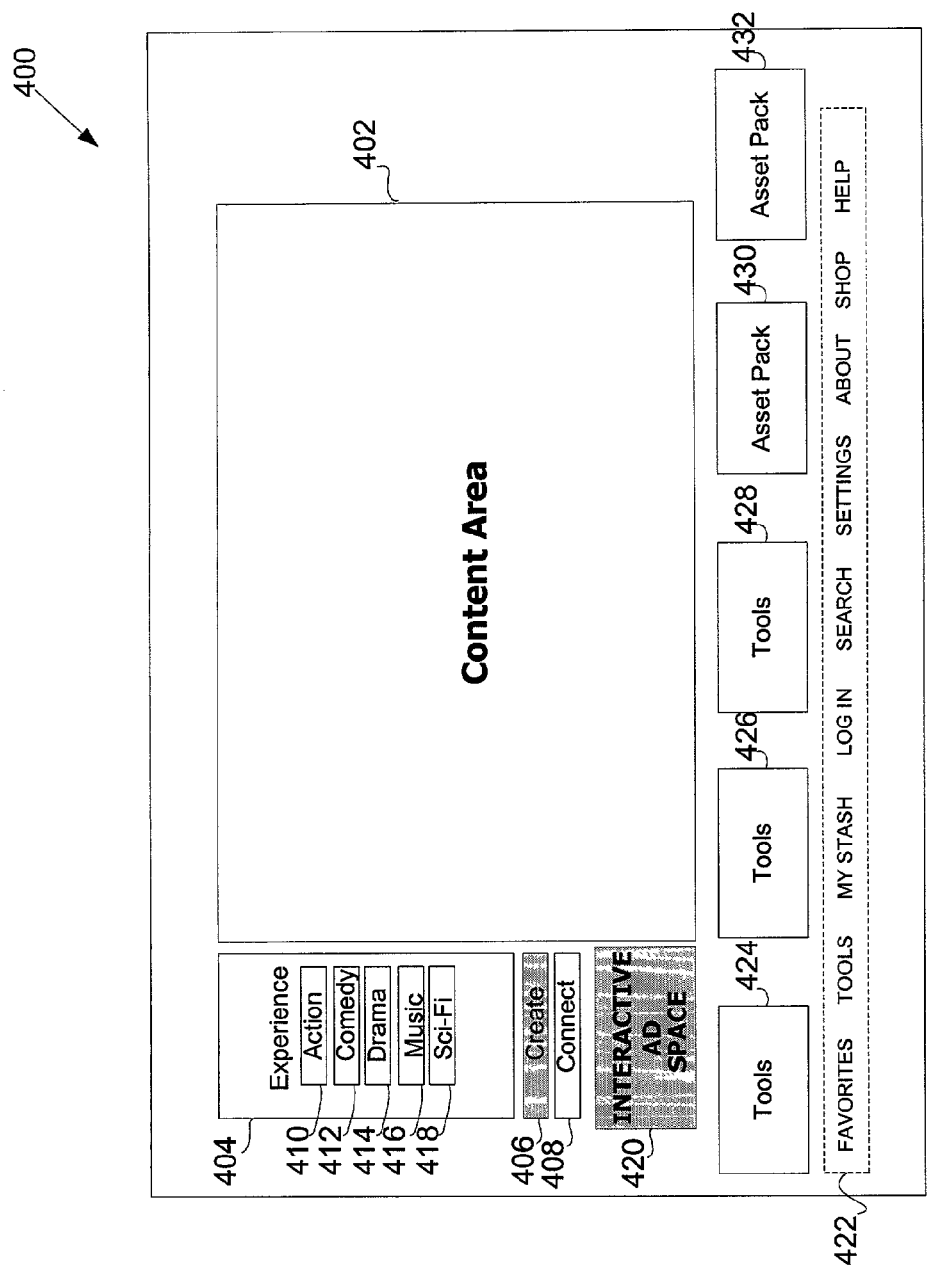
FIG. 4 shows an exemplary create channel page, according to an embodiment of the invention.

When the user selects the create user-selectable operator 206 on home page 200 or the create user-selectable operator 306 on channel home page 300, the user may be linked to a create channel page similar to the create channel page 400 shown in FIG. 4. Similarly to exemplary home page 200 and exemplary action channel home page 300, exemplary create channel page 400 comprises content area 402, "experience" channel area 404 (comprising user-selectable operators 410 (action), 412 (comedy), 414 (drama), 416 (music), and 418 (science fiction) for selecting a genre of media content), a "create" user-selectable operator 406, a "connect" user-selectable operator 408, interactive advertising space 420, and menu area 422.

Interactive advertising space 420 and menu area 422 may provide the same functionality as that described above for home page 200 and channel home page 300. Content area 402 may comprise media content related to an action genre. For example, there may be an action video segment visible in content area 402.

Create channel page 400 may further comprise user-selectable promotes, such as promotes 424, 426, and 428, linking the user to media creation and editing tools. In addition to media creation and editing tools, create channel page 400 may further comprise links to user-selectable asset packs, such as asset pack 430 and 432. Both the promotes and asset packs featured on the create channel page may be accessed and/or downloaded by the user for use in creating "personalized media content items" (i.e., media content items selected by, created by, or edited by the user).

Figure 5:
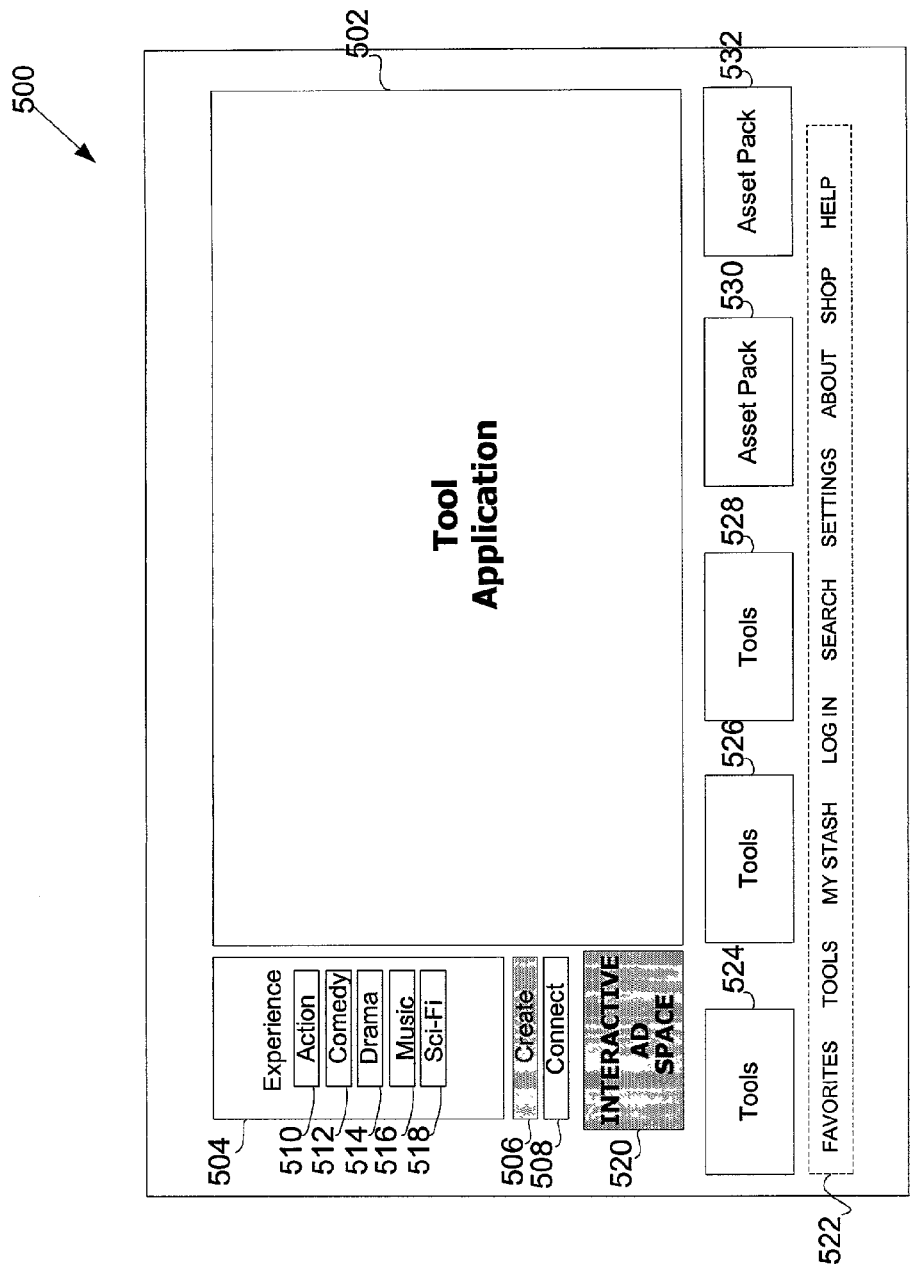
FIG. 5 shows an exemplary tool application page, according to an embodiment of the invention.

When the user accesses a media creation and editing tool or asset pack, the user may use that tool or asset pack on-line. FIG. 5 shows tool application page 500. Exemplary tool application page 500 comprises tool application area 502, "experience" channel area 504, (comprising user-selectable operators 510 (action), 512 (comedy), 514 (drama), 516 (music), and 518 (science fiction) for selecting a genre of media content), a "create" user-selectable operator 506, a "connect" user-selectable operator 508, interactive advertising space 520, and menu area 522.

Interactive advertising space 520 and menu area 522 may provide the same functionality as that described above for exemplary home page 200, exemplary channel home page 300, and exemplary create channel page 400. In some embodiments, when a user selects a genre user-selectable operator in the experience area 504 of tool application page 500, the user may be able to experience media content of that genre that was previously created with that tool. Similarly, when the user selects the connect user-selectable operator, the user may be linked to a page where the user may, for example, discuss the tool with other users and may see a user rating for the tool.

Tool application page 500 may provide the user with a media creation and editing tool such as a digital media editing application 502. The digital media editing application 502 may allow the user to create and/or edit audio and/or video elements that the user may then store in the user's stash and load onto the user's showcase page, as discussed in more detail below. Tool application page 500 may further comprise promotes for additional tools, such as tool promotes 524, 526, and 528. Tool application page 500 may also further comprise promotes for additional asset packs, such as asset pack promotes 530 and 532. Tool application page 500 may further comprise user-selectable operators that activate ("launch") tool poppers containing additional media content creating and editing functionality.

Figure 6:
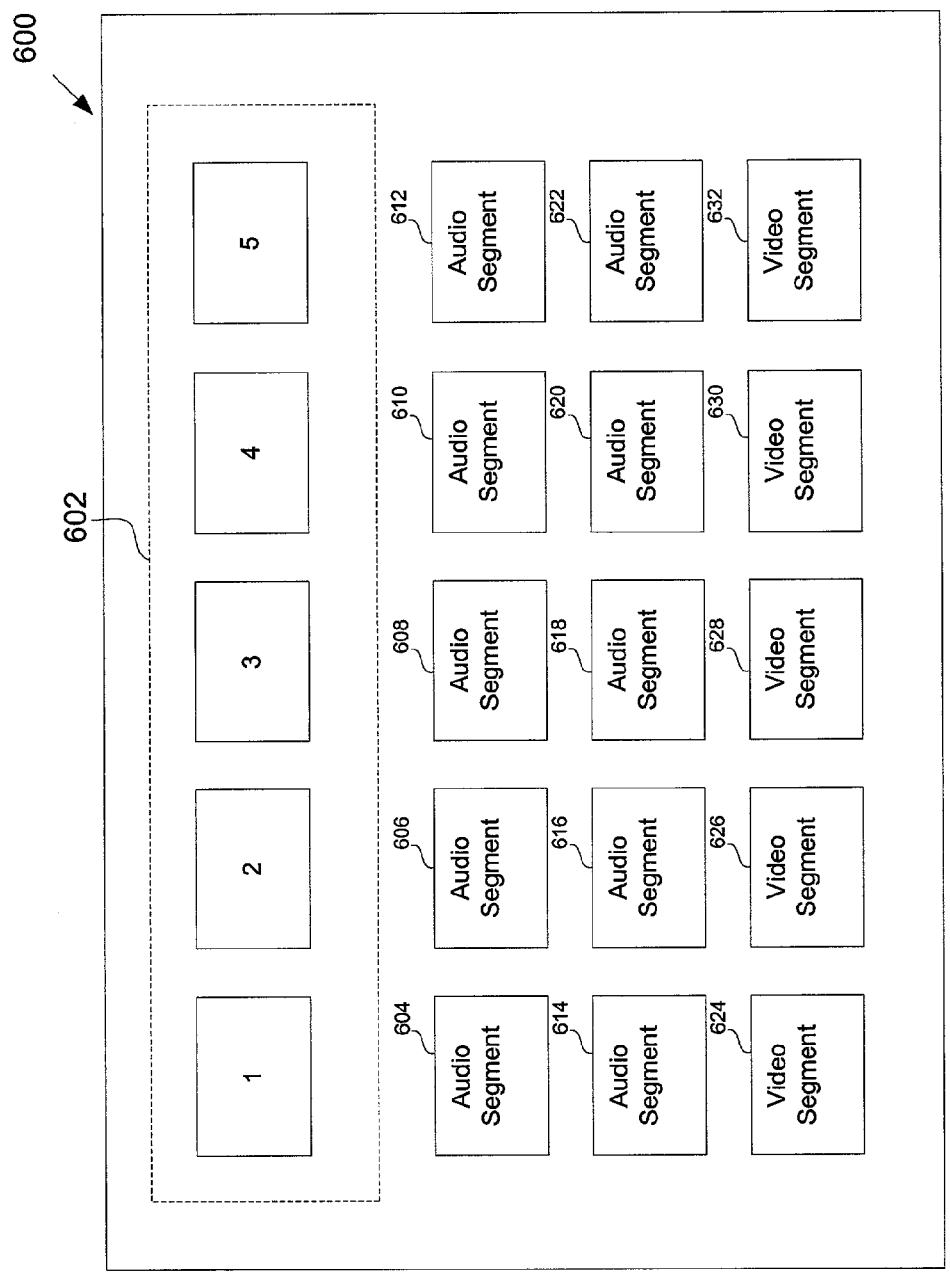
FIG. 6 shows an exemplary digital media editing application, according to an embodiment of the invention.

In some embodiments, digital media editing application 502 may facilitate the creation of personalized media content by providing a timeline into which the user may, for example, drag and drop pre-existing digital video and/or audio segments in order to create a continuous video and/or audio sequence. An example of such a timeline is shown in FIG. 6. FIG. 6 shows exemplary digital media editing application 600, which presents to the user a timeline 602, which comprises a number of empty media content "containers" (five in the present example).

Figure 7:
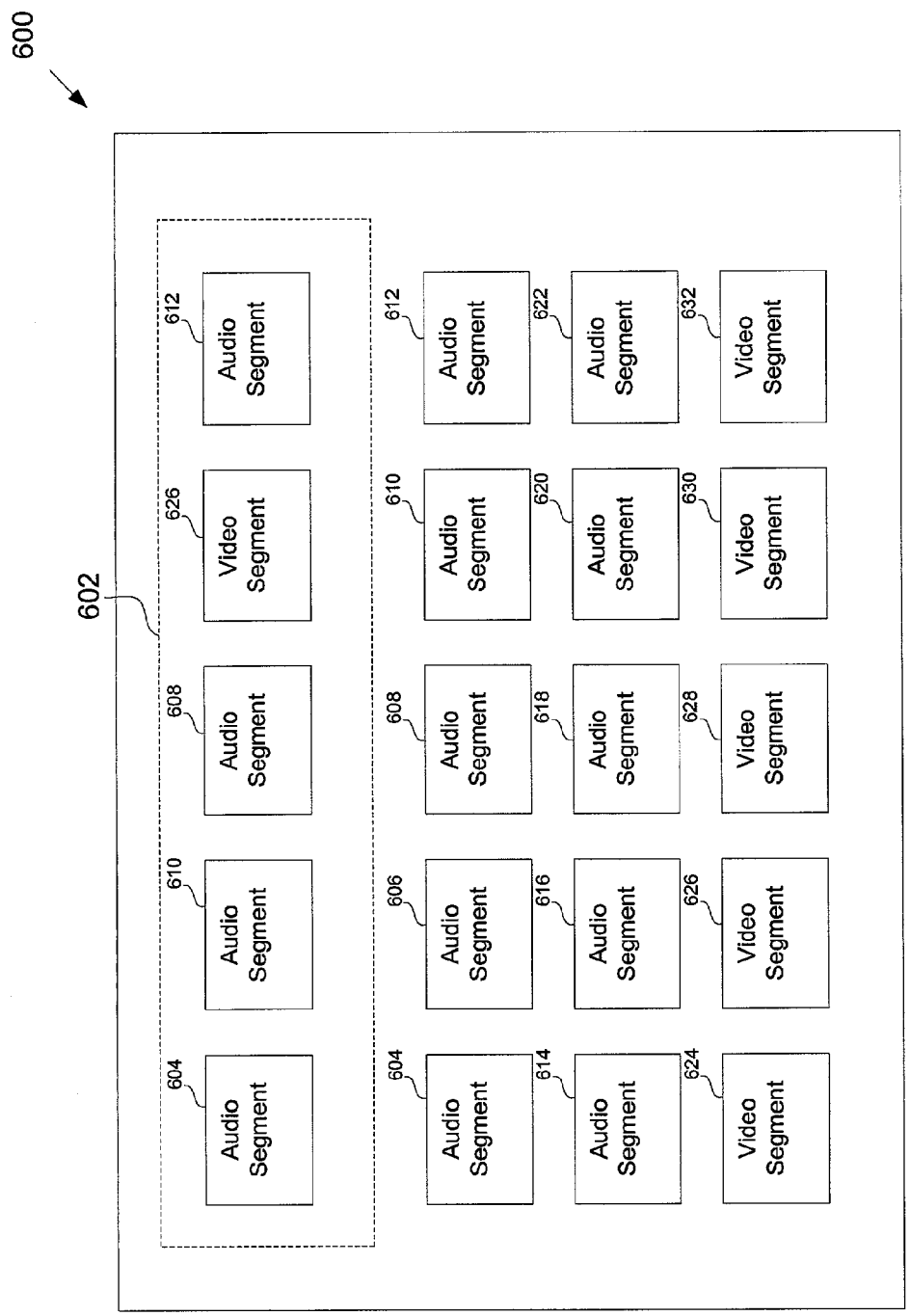
FIG. 7 shows a populated timeline, according to an embodiment of the invention.

As described above, these media content containers may be filled with pre-existing digital video and/or audio segments such as segments 604, 606, 608, 610, 612, 614, 616, 618, 620, 622, 624, 626, 628, 630, and 632 by, for example, dragging and dropping a copy of a segment into a media content container. Any particular segment may comprise an audio or video fragment such as a drumbeat or a video clip from a movie. FIG. 7 shows an example of a populated timeline 602. As shown in FIG. 7, a copy of audio segment 604 has been placed in media content container 1 in timeline 602. Similarly, a copy of audio segment 610, audio segment 608, video segment 626, and audio segment 612 have been placed in media content containers 2 through 5, respectively.

In one embodiment, the timeline may be saved as a single file to the user's stash and from there may then be loaded onto the user's showcase page. Thus, by enabling the user to drag and drop a number of the segments into timeline 602, digital media editing application 600 facilitates the creation of personalized media content by a user.

Figure 8:
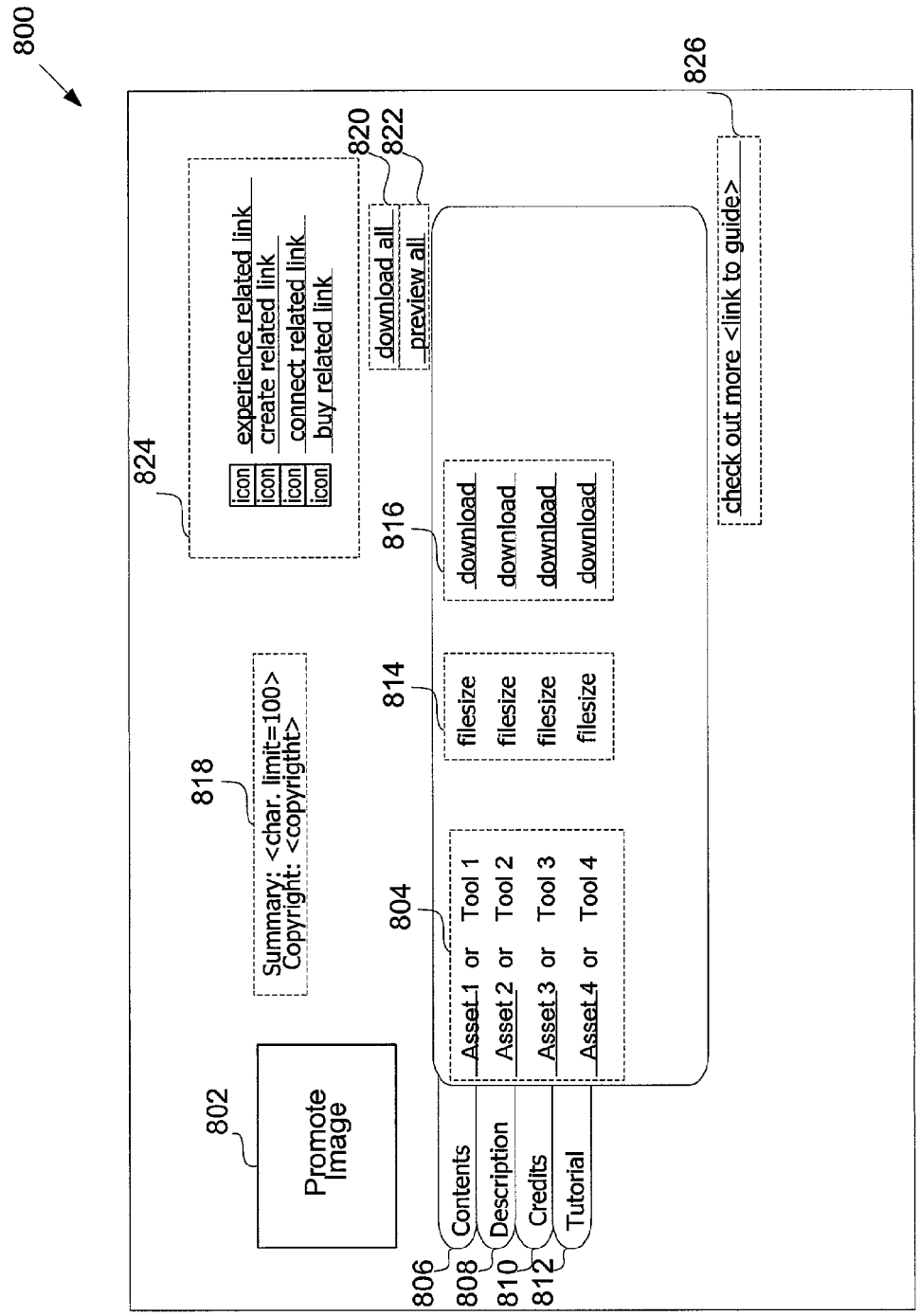
FIG. 8 shows an exemplary download tool page, according to an embodiment of the invention.

In some embodiments, in addition to on-line creation of media content, the website user may download media creation and editing tools, as well as digital asset packs, from the website to the user's UND for off-line media content creation. This may be done from a download tool page 800 on the website, as shown in FIG. 8. The user of the website may be linked to exemplary download tool page 800 by, for example, clicking or otherwise selecting a promote for this page located on another page or popper. The user may also be linked when the guide is displayed and the user selects the function to "View Download Information" for an asset pack or a tool. Furthermore, the user may be linked to download tool page 800 by performing a search for particular asset packs or tools and then selecting "download information links" from the search results page. Additionally, in some embodiments, the user may be linked to download tool page 800 when a popper is displayed for an asset pack and the user selects a "View Information" function.

The purpose of download tool page 800 may be to allow users to view information about and/or download a media creation and editing tool or suite of such tools. Promote image 802 may be the same promote image that the user selected to link to download tool page 800. However, in one embodiment, promote image 802 may have no functionality. Asset and tool list 804 lists the assets and/or tools that may make up a suite of tools for which the user may desire more information and/or that the user may wish to download.

Adjacent to asset and tool list 804 are user-selectable tabs that provide information about the assets and/or tools in list 804. When the user selects contents tab 806, a listing of the contents of the selected asset or tool in list 804 may be displayed to the user. Similarly, when the user selects description tab 808, a description of the selected asset or tool may be displayed to the user. When the user selects credits tab 810, a list of names of, for example, the developers of the asset pack or tool, may be displayed to the user. Additionally, if a tutorial is included with an asset pack or tool, the user may view information about the tutorial by selecting the tutorial tab 812. The file size 814 may be displayed for each asset pack or tool in list 804. The user may select an individual asset pack or tool to download from list 804 by selecting the download operator 816 for the corresponding asset pack or tool. Additionally, summary and copyright information 818 for the selected asset pack or tool in list 804 may be displayed to the user.

In one embodiment, the user may download or preview all asset packs and/or tools in list 804 by selecting either the "download all" operator 820 or the "preview all" operator 822, respectively. When the user selects the "preview all" operator 822, a media popper may be launched and may display to the user a stream of the assets in list 804.

Related links section 824 allows the user to quickly link to related areas of the website such as pages and poppers. The "experience related link" may link the user to pages where the user may experience related media content. The "create related link" may link the user to more related media creation and editing tools. The "connect related link" may link the user to pages where the user may, for example, see other users' media content that was created with the selected asset pack or tool. The "buy related link" may link the user to pages where the user may purchase, for example, complete versions of the asset pack or tools. The "check out more" operator may link the user to a portion of the guide containing related topics.

In one embodiment, after the user has selected a download operator 816 or the download all operator 820, the website may verify that the user is logged in to the website. If the user is not logged in, a user log in page may be launched so that the user may log in. Once the user is logged in to the website, the user may next be asked where to save the asset pack or tool on the user's UND. Once this information is provided by the user, the download may begin and the asset pack or tool will be saved to the user's UND or other user-designated storage location. The user may then use the asset packs or tools to create and/or edit media content off-line.

Whether the user creates media content on-line or off-line, the user may store this content to the user's stash. The user's stash may be assigned to the user when the user registers with the website. When the user has created media content off-line, the user may upload the media content to the user's stash.

Media Content Storage and Management

In some embodiments, the broadband creativity platform may provide users with storage space for their personalized media content (for example, space may be provided on memory system 108 in FIG. 1). The user may, for example, be provided with 50 Megabytes ("Mb") of storage capacity, also referred to as the user's stash in the present disclosure. This stash may serve as a repository for the user's media content. In one embodiment, all file formats may be accepted in the stash. Files stored in the user's stash may remain private and may not be accessed or viewed by other users of the website. Once the user stores media content to their stash, the user may manage their files within the stash in various ways, including, but not limited to, viewing, editing (for example, changing the title of the file), deleting, and uploading files from the stash to other locations, including, but not limited to, a user showcase page.

The website may include a "stash manager page" through which the user may manage the user's stash. The user may access the stash manager page in various ways, including, but not limited to, selecting an appropriate user-selectable operator (for example, a "stash manager" user-selectable operator) available on other pages or poppers or from a global navigation menu provided by the website. In one embodiment, after the user has selected the appropriate user-selectable operator, the website may verify that the user is logged in to the website. If the user is not logged in, a user log in page may be launched so that the user may log in. Once the user is logged in to the website, the user may access the stash manager page.

Figure 9:
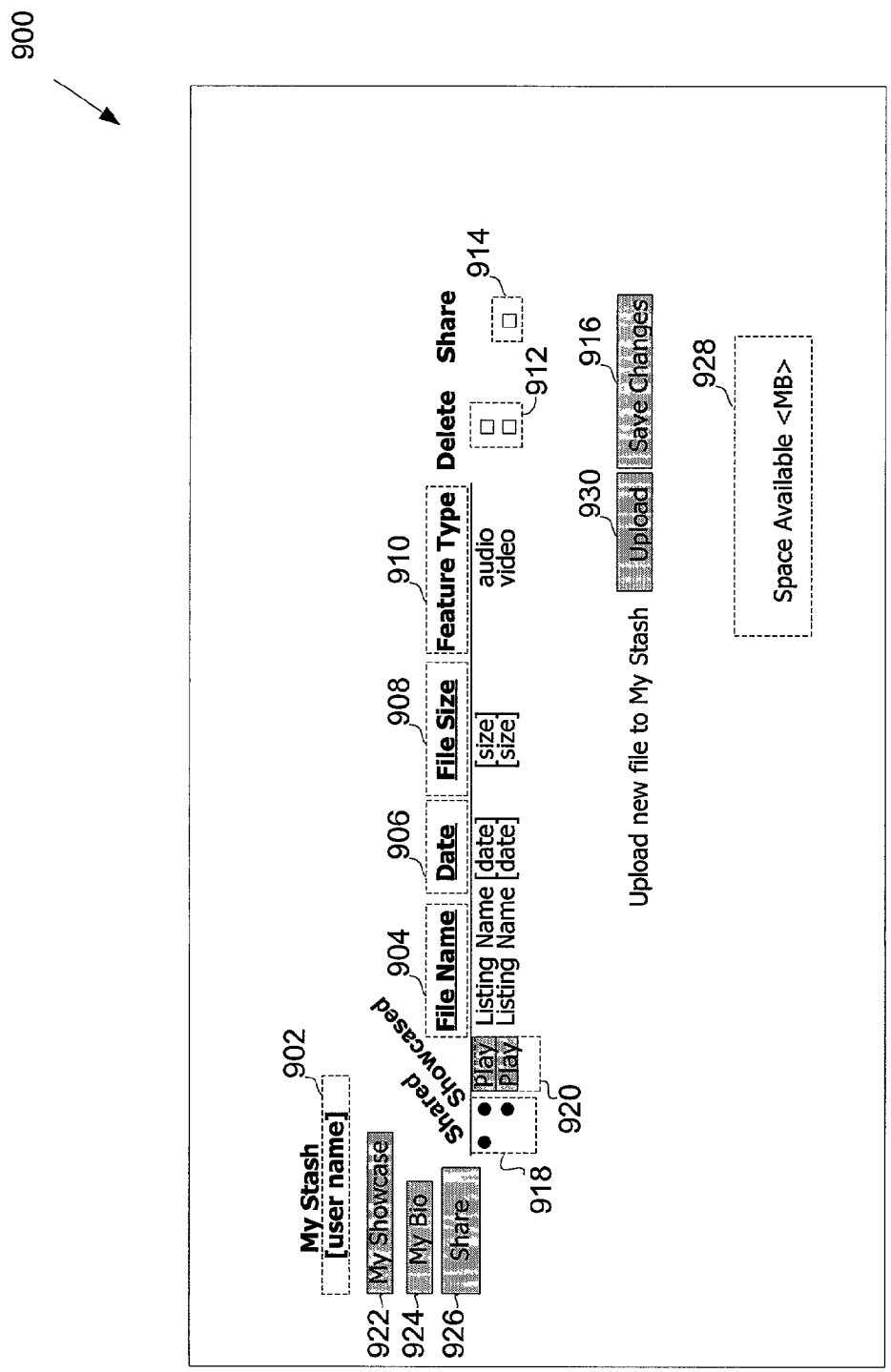
FIG. 9 shows an exemplary stash manager page, according to an embodiment of the invention.

An exemplary stash manager page 900 is shown in FIG. 9. The user's user name may appear in text area 902 of stash manager page 900. Text area 902 may be static (i.e., there may be no functionality associated with the text). In some embodiments, the user name may be selected by the user at registration. The stash manager page 900 may list the contents of the user's stash in a directory format.

The file name 904 is shown, along with the date of file creation 906, the size of the file (in Mb) 908, and the feature type 910 of the file (i.e., audio or video). In addition, selectable graphic indicators, such as, but not limited to, check boxes, may be associated with a particular file and may be selected to indicate that the user wishes to delete, share, or perform some other function on the indicated file. For example, stash manager page 900 includes "delete" check boxes 912, which may allow the user to flag associated files for deletion. Also included is a "share" check box 914, which may allow the user to flag an associated file for sharing (to be discussed further below). The deletion or sharing of files may not occur until the user completes the transaction by selecting the "save changes" user-selectable operator 916 and confirming the change.

Associated with each file listed in the file listing are indicators 918 that indicate whether the file is shared or showcased (to be discussed further below). Also associated with each listed file is a "play" user-selectable operator 920 which may be displayed for files that are playable (for example, ".aif," ".wav," ".au," ".ra," ".rm," ".wmv," ".asf," and ".swf" files). Play buttons 920 will not be displayed for all non-playable files (for example, ".acd" files, and photo and document files).

A user-selectable "My Showcase" link 922 may be provided on stash manager page 900 which may allow the user to link to the user's showcase page on the website (to be discussed further below). Similarly, a user-selectable "My Bio" link 924 may be provided which may allow the user to link to the user's bio page on the website. In addition, a user-selectable "Share" link 926 may be provided which may allow the user to link to a "share page" on the website (to be discussed further below).

The stash manager page 900 may also show the user the remaining storage space in the user's stash. "Space available" area 928 may serve this purpose. Space available area 928 may contain static text. Initially (i.e., before any user files are stored), the message may indicate the value as the maximum space allotted to the user by the website (for example, 50 Mb). The value shown in this message may update upon each upload of a file to the stash or upon deletion of a file from the stash. The website may perform a check against this value to ensure that it is not exceeded before allowing an upload to the stash.

Figure 10:
FIG. 10 shows an exemplary "Upload File To Stash" pop-up window, according to an embodiment of the invention.

Stash manager page 900 may also include an "upload" user-selectable operator 930 which may allow the user to upload a file to the user's stash. When upload user-selectable operator 930 is selected by the user, "Upload File To Stash" pop-up window 1000, shown in FIG. 10, may be launched within stash manager page 900.

Exemplary upload file to stash pop-up window 1000 comprises a "browse" user-selectable operator 1002 which may allow the user to locate a piece of media content on the user's UND that the user wishes to upload. When the user selects the desired piece of content and confirms the selection, "File Path" text box 1004 may be populated by the file path of the selected file. "Name" free text entry box 1006 may allow the user to enter a desired name for the selected file. This may be the name of the file within the user's stash.

The "Continue" user-selectable operator 1008 may allow the user to initiate the upload process. In some embodiments, the website may verify that the stash has allowable space for the uploaded file. If the user has enough remaining space in their stash, the website may store the file to the user's stash. If the user does not have enough space, an error message may be presented to the user. Alternatively, the user may select the "Cancel" user-selectable operator 1010 if the user chooses to abandon the upload process. If the user does so, the user may be returned to the stash manager page 900.

If the user has selected the continue user-selectable operator 1008, the "Details About Your File" pop-up window 1100, shown in FIG. 11, may be launched within stash manager page 900. The file name entered by the user in the name free text entry box 1006 on the upload file to stash pop-up window 1000 may appear in text area 1102 of the details about your file pop-up window 1100. Text area 1102 may be static.

"Author/Artist" free text entry box 1104 may allow the user to enter a name for the creator of the uploaded media content. Author/artist free text entry box 1104 may be pre-populated with the user name associated with the stash to which the file was uploaded. The "Description" free text entry box 1106 may allow the user to enter a description for the uploaded file. The "Credits" free text entry box 1108 may allow the user to enter information about, for example, co-contributors to the creation of the media content. The "Keywords" free text entry box 1110 may allow the user to enter key words related to the uploaded file. The key words may be separated by commas. In some embodiments, the website may use these key words to search for media content.

"Feature Type" pulldown box 1112 may allow the user to choose a feature type (for example, audio or video) suitable for the uploaded file from a list of available feature types. "Feature Sub-Type" pulldown box 1114 may allow the user to choose a feature sub-type suitable for the uploaded file from a list of available feature sub-types. "Genre" pulldown box 1116 may allow the user to choose a genre (for example, comedy or music) suitable for the uploaded file from a list of available genres. "Sub-Genre" pulldown box 1118 may allow the user to choose a feature sub-genre suitable for the uploaded file from a list of available sub-genres.

The "Submit" user-selectable operator 1120 may allow the user to submit the content to be stored in the user's stash. The website may perform validation of the submitted file information (for example, that required fields are populated) before accepting the file to be stored in the stash. If the file is successfully uploaded, the website will capture the file size and creation date, along with the information (metadata) about the file entered by the user, and save them to the stash. Alternatively, the user may select the "Cancel" user-selectable operator 1122 if the user chooses to abandon the upload process. If the user does so, the user may be returned to the stash manager page 900.

Sharing Media Content Between Users

In some embodiments, users of the website may be able to share media content files in their stash with one another through a "manage share page." The user may access the manage share page in various ways, including, but not limited to, selecting an appropriate user-selectable operator (for example, a "share manager" user-selectable operator) available on other pages or poppers or from a global navigation menu (such as a website graphical guide) provided by the website. In one embodiment, after the user has selected the appropriate user-selectable operator, the website may verify that the user is logged in to the website. If the user is not logged in, a user log in page may be launched so that the user may log in. Once the user is logged in to the website, the user may access the manage share page.

Figure 12:
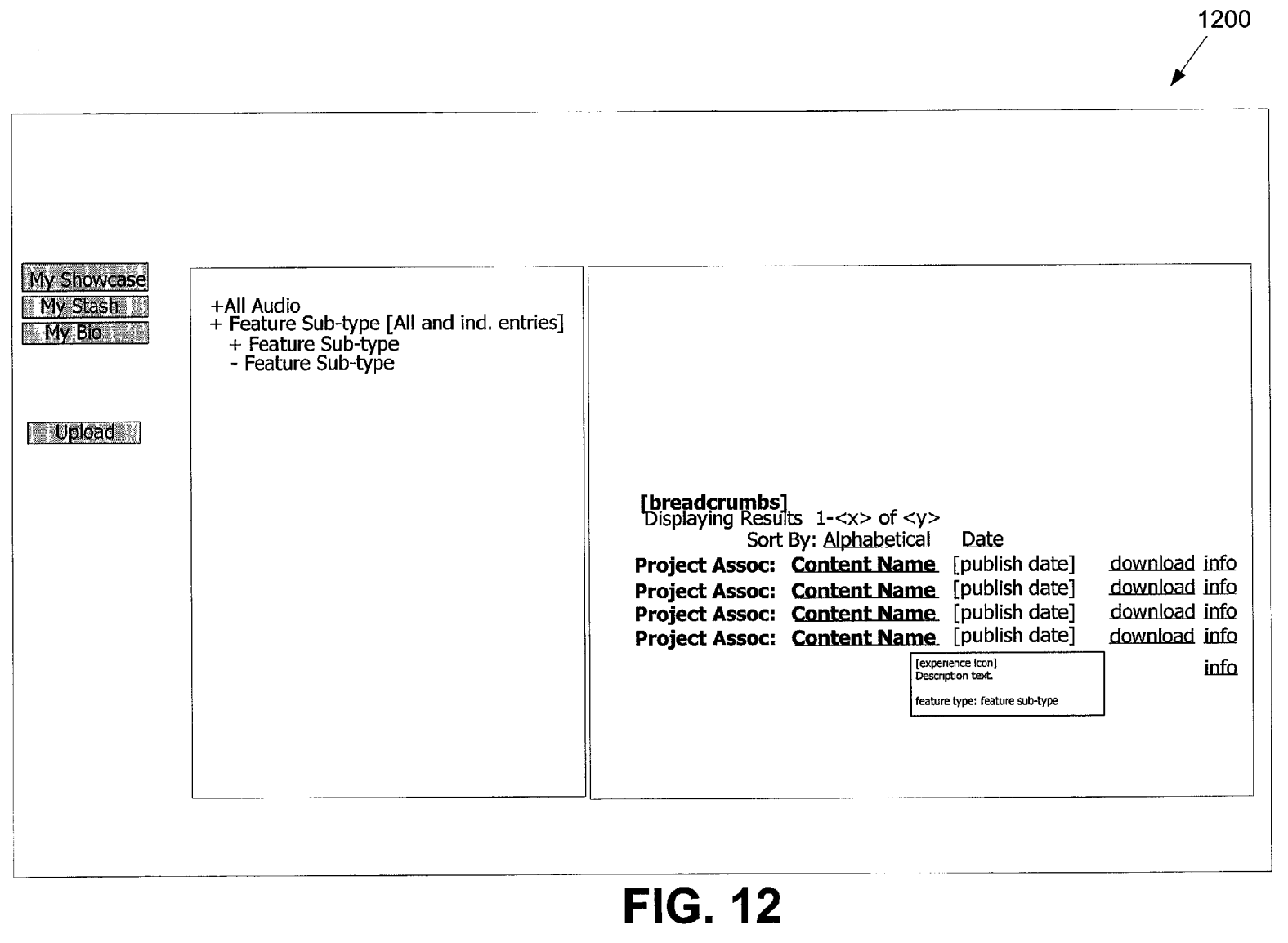

An exemplary manage share page 1200 is shown in FIG. 12. Manage share page 1200 may list the contents of the user's stash in a directory format. The file names 1202 may be shown, along with the date of file creation 1204. In some embodiments, when a user rolls over (for example, with the mouse cursor) a file name, the user may be presented with more information about the file, as shown by information box 1210. Information box 1210 may inform the user about the feature type (i.e., audio or video) and feature sub-type of the selected file name, as well as a description of the file that may have been provided by the user that submitted the file to the manage share page 1200.

The user may see more information about a particular file by selecting an "information" user-selectable operator 1208 associated with each file. The user may choose to download a particular file by selecting a "download" user-selectable operator 1206 associated with each file. The user will then be queried as to the destination of the download.

A user-selectable "My Showcase" link 1212 may be provided on manage share page 1200 which may allow the user to link to the user's showcase page on the website (to be discussed further below). Similarly, a user-selectable "My Stash" link 1214 may be provided which may allow the user to link to the user's stash page on the website. In addition, a user-selectable "My Bio" link 1216 may be provided which may allow the user to link to a user bio page on the website.

Figure 13:
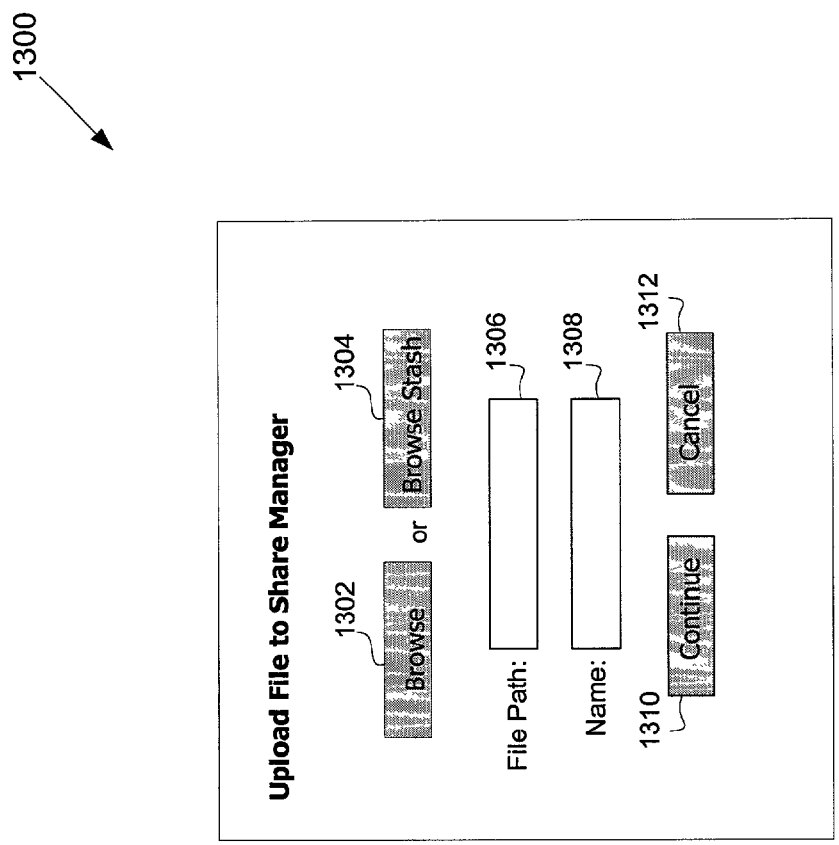
FIG. 13 illustrates an exemplary "Upload File To Share Manager" pop-up window, according to an embodiment of the invention.

The user may upload their own media content files to the manage share page 1200 by selecting the "upload" user-selectable operator 1218. When upload user-selectable operator 1218 is selected, the website may launch an "Upload File To Share Manager" pop-up window 1300, as shown in FIG. 13.

Exemplary upload file to share manager pop-up window 1300 comprises a "browse" user-selectable operator 1302 which may allow the user to locate a piece of media content on the user's UND that the user wishes to place on the manage share page 1200. In one embodiment, the user may first be required to upload that media content to their stash and flag that media content as shared.

When the user selects the desired piece of content and confirms the selection, "File Path" text box 1306 may be populated by the file path of the selected file. "Name" free text entry box 1308 may allow the user to enter a desired name for the selected file. This may be the name that the file will have when displayed on the manage share page 1200.

Figure 14:
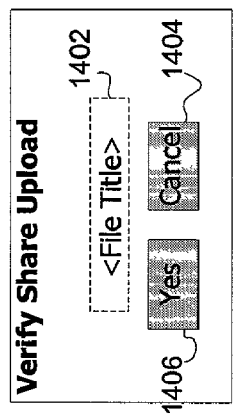
FIG. 14 illustrates an exemplary "Verify Share Upload" pop-up window, according to an embodiment of the invention.

The user may select the "Cancel" user-selectable operator 1312 if the user chooses to abandon the upload process. If the user does so, the user may be returned to the manage share page 1200. The "Continue" user-selectable operator 1310 may allow the user to initiate the upload process. In one embodiment, if the file has been located on the user's UND using the browse user-selectable operator 1302 and is to be uploaded to the user's stash, the website may verify that the stash has allowable space for the uploaded file. If the user has enough remaining space in their stash, the website may launch a "Verify Share Upload" pop-up window 1400, as shown in FIG. 14.

The "File Title" 1402 may be displayed to the user. If the User selects the 'Cancel' user-selectable operator 1404, the website may not add the specified file to the manage share page 1200 and may return the user to the manage share page 1200. The user may select the "Yes" user-selectable operator 1406 if the user wishes that file to be uploaded to the user's stash. When the user selects the yes user-selectable operator 1406, the "Details About Your File" pop-up window 1100, which was shown in FIG. 11, may be launched. The user may then enter meta-data for the file, as described above in relation to FIG. 11.

If the user selects the "Cancel" user-selectable operator 1122, the website may not add the specified file to the manage share page 1200 and may return the user to the manage share page 1200. If the user selects the "Submit" user-selectable operator 1120, the website stores the file on the user's stash. The user may then be returned to the manage share page 1200. When the user next returns to the stash manager page 900, the user may see an updated file list including the newly uploaded file. The shared indicator 918 associated with the newly uploaded file may reflect that the newly uploaded file is shared. The user may also see that the space available area 928 reflects the decrease in remaining storage space due to the addition of the newly uploaded file.

Figure 15:
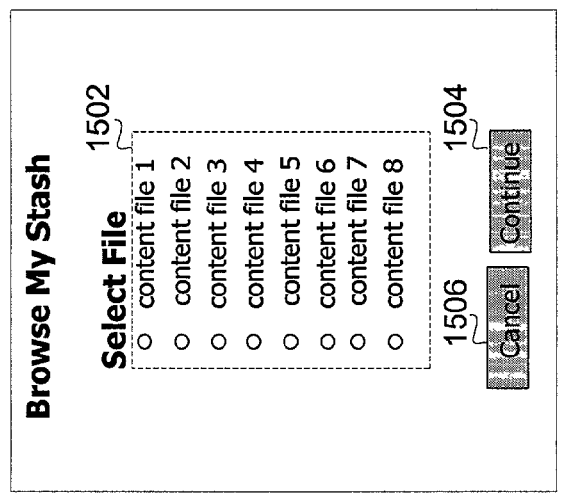
FIG. 15 illustrates an exemplary "Browse My Stash" pop-up window, according to an embodiment of the invention.

Referring again to FIG. 13, the share manager pop-up window 1300 also comprises a "browse stash" user-selectable operator 1304 which may allow the user to locate a piece of media content that is already stored on the user's stash that the user wishes to share on the manage share page 1200. When the browse stash user-selectable operator 1304 is selected, the website may launch a "Browse My Stash" pop-up window 1500, as shown in FIG. 15.

Exemplary browse my stash pop-up window 1500 comprises stash file display area 1502. In one embodiment, all files stored in the user's stash will be displayed in the file display area 1502. In some embodiments, only files of a particular format may be stored on manage share page 1200 (for example, ".hlx," ".acd," ".wav," ".au," ".aif," and ".ra" audio files). In these embodiments, only files in the correct format may be displayed in the browse my stash pop-up window 1500. In some embodiments, if the number of displayed files exceeds the pop-up screen size, the user may be able to select a user-selectable operator (for example, a "next" user-selectable operator) which may allow the user to view additional files.

The user may select the file to be shared from the stash file display area 1502 by, for example, clicking on a radio button or other user-selectable operator adjacent to the file. If the user selects the "Cancel" user-selectable operator 1506, the website may not add the specified file to the manage share page 1200 and may return the user to the manage share page 1200. If the user selects the "Continue" user-selectable operator 1504, the website may launch a "Verify Share Upload" pop-up window 1400, as was shown in FIG. 14.

The "File Title" 1402 may be displayed to the user. If the User selects the 'Cancel' user-selectable operator 1404, the website may not add the specified file to the manage share page 1200 and may return the user to the manage share page 1200. The user may select the "Yes" user-selectable operator 1406 if the user wishes that file to be shared. When the user selects the yes user-selectable operator 1406, the user may then be returned to the manage share page 1200. When the user next returns to the stash manager page 900, the user may see an updated file list. The shared indicator 918 associated with the newly shared file may reflect that the file is now shared. It can be seen that when the file is already present in the user's stash, the user is not required to enter the met-data, as when the file is uploaded from the user's UND, because the user entered the information when initially storing the file to the stash.

A user's shared files may be downloaded by other users of the website and be incorporated by another user into their media content creations. In this way, website users may "connect" with one another and thereby enhance their media content creations and their website experience.

Media Content Publishing Process

In some embodiments, the website may provide to the user a "user showcase page" on which to display ("publish") personalized media content to other users of the platform, for example, in templates with pre-defined styles. The user showcase page may be viewable by other users of the platform. The user may choose media content from either the user's stash or from the user's favorites to place on their user showcase page.

In some embodiments, the user may be restricted to storing on the user's showcase page only media content of particular media formats. For example, in one embodiment, the user may store movie files with ".rm" and ".asf" extensions; image files with ".jpg," ".jpeg," and ".gif." extensions; audio files with ".mp3," ".wav," ".acd," and ".hlx" extensions; and flash files with a ".swf" extension.

The showcase page may be linked to a user "bio page" where the user may display personal and other information to other users. If media content displayed on a user's showcase page is particularly compelling, website administrators may choose to "ingest" that media content into the main display pages of the website.

Figure 16:
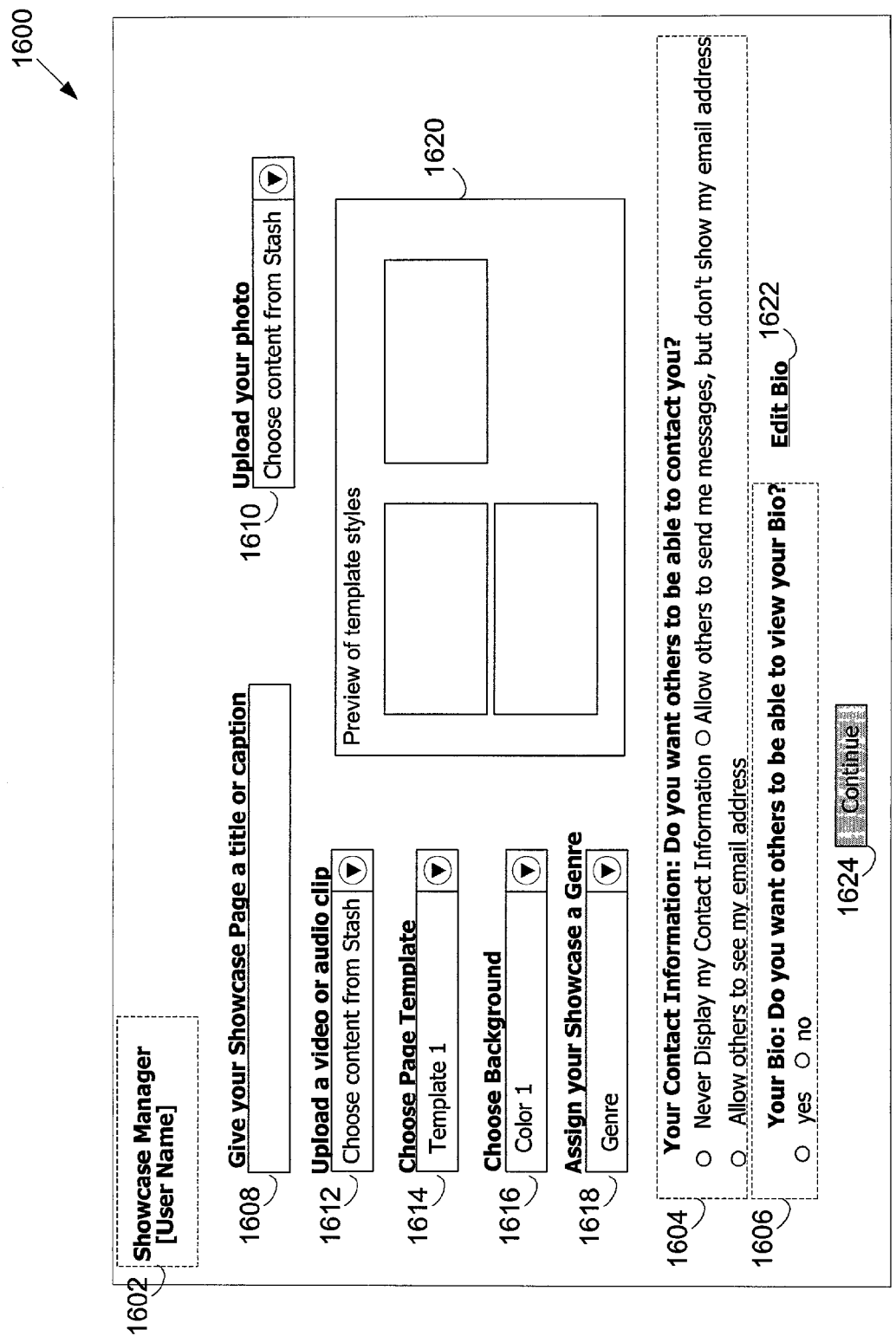
FIG. 16 illustrates an exemplary "Manage User Showcase" page, according to an embodiment of the invention.

As discussed above, the media content stored by the user in the user's stash may be private and may only be accessed by the user. The user may, however, choose to load selected content onto the user's showcase page. In one embodiment, the user manages their showcase page through a manage user showcase page 1600, as shown in FIG. 16. The purpose of manage user showcase page 1600 is to allow a user to create and/or edit their showcase page information and contents. A user is able to manage the following information on their showcase page: the title or caption of the page, whether the user's bio/contact information is public or private, the page template, color, and configuration. The user may also add media content to the user's showcase page from the user's stash or favorites, including a title, icon and either a promote link or text link. In some embodiments, the user must be registered and logged in to the website in order to access manage user showcase page 1600.

When the manage user showcase page 1600 is first displayed to the user, the page may be shown with fields pre-populated with the current user settings. Static text area 1602 may display the page description along with a "user name" field. The user name may be selected by the user at registration. A radio button (or other suitable user-selectable operator) selection area 1604 may be provided to allow the user to provide a link to display their contact information (for example, the user's e-mail address and/or phone number). Selection area 1606 may be provided to allow the user to provide a link to a related bio page on their showcase page. In one embodiment, this link is a binary field which either links the bio page and showcase page on both pages or removes the links on both the user's bio and showcase pages.

Free text entry box 1608 may allow the user to enter a title for their showcase page. In one embodiment, the user may enter up to 63 characters into free text entry box 1608. If the user does not enter a name, the name may default to the user name that the user may have chosen at registration. Pulldown box 1610 may allow the user to choose from a list of photo files stored on their stash. The chosen photo may then be displayed on their user showcase page. In one embodiment, only those photo files in the user's stash that are in a valid photo format for the showcase page will be displayed to the user.

Pulldown box 1612 may allow the user to choose from a list of video or audio files stored on their stash. The chosen video or audio clip may then be featured on their user showcase page as a user-selectable video or audio clip. In one embodiment, only those video or audio files in the user's stash that are in a valid video or audio format for the showcase page will be displayed to the user. Pulldown box 1614 may allow the user to choose a pre-defined template for their user showcase page. The template will define the format of the showcase page (i.e., where page elements are located on the page). Pulldown box 1616 may allow the user to choose a background color palette for the user showcase page.

A template preview window 1620 may be provided to allow the user to preview the template styles. Thumbnail examples of showcase page templates may be shown to the user. In one embodiment, this template preview page has no functionality (i.e., the image is static). In one embodiment, if the user does not select a template or background color palette, a pre-defined default template and color palette may be used.

Pulldown box 1618 may allow the user to designate a genre (for example, comedy, drama, action, music, etc.) that reflects the type of content on the user's showcase page. "Edit bio" link 1622 may link the user to a user settings page which may contain an "Edit Bio" tab. The user may then select the tab to link to the user's bio page for editing.

Figure 17:
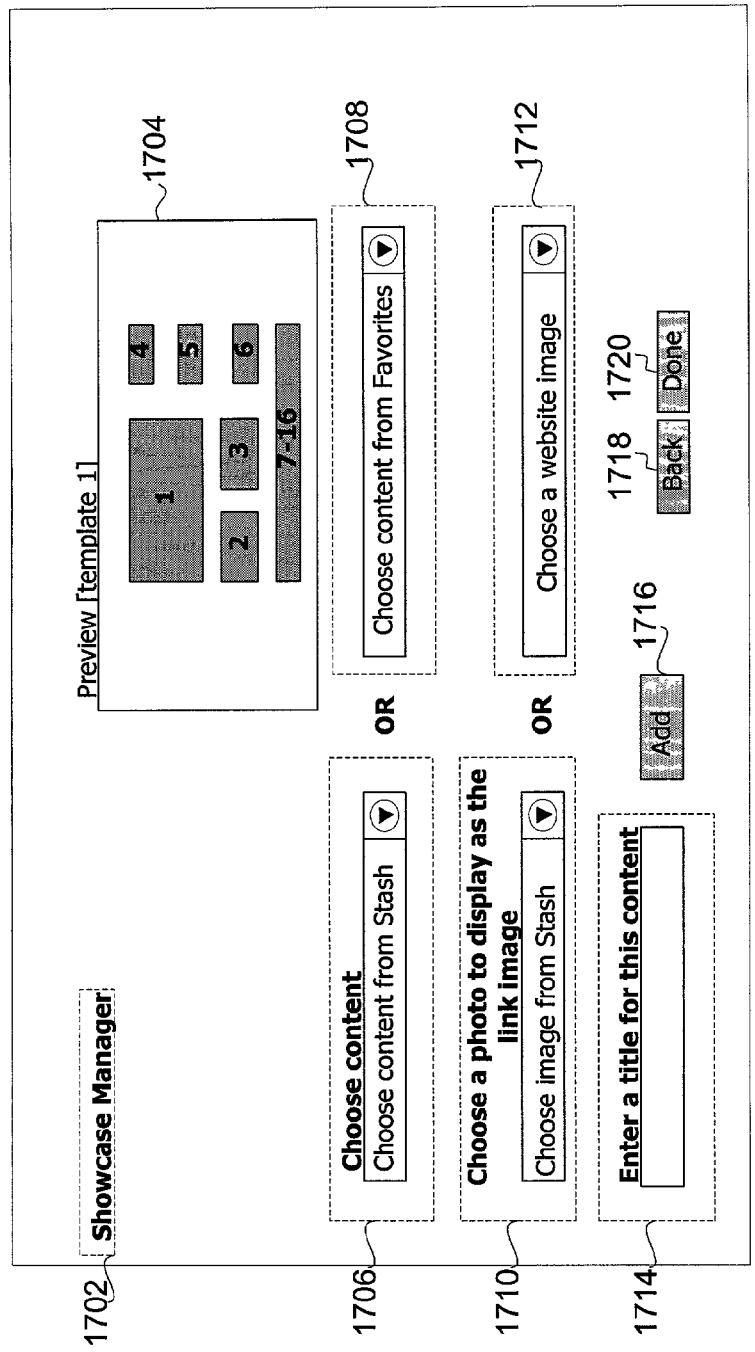
FIG. 17 illustrates an exemplary "Showcase Manager" page, according to an embodiment of the invention.

Once the user has entered their name and selected their preferences for their showcase page, the user may click or otherwise select the continue operator 1624. When continue operator 1624 has been selected, the information entered by the user will be saved, for example, in memory system 108, shown in FIG. 1, and a showcase manager page 1700 may be launched, as shown in FIG. 17.

Exemplary showcase manager page 1700 comprises static text area 1702, which displays the page description. Showcase manager page 1700 also comprises template preview area 1704, where the user may preview the template that the user selected on manage user showcase page 1600. If the user is not satisfied with the user showcase page template currently displayed on showcase manager page 1700, the user may navigate back to the previous page by selecting the "back" user-selectable operator 1718. The user may then be returned to the manage user showcase page 1600 and may select a new template.

In one embodiment, template preview area 1704 comprises numbered "slots" that represent areas on the user showcase page that the user may populate with, for example, promote links or text links to media content. The number of slots available may be dependent on the template selected by the user on manage user showcase page 1600. The slots may initially be blank. The user may click or otherwise select one of the numbered slots as the desired location for a piece of content.

Once a slot is selected, the user may choose a link to media content to populate the selected slot. The user may link to media content that is stored in the user's stash by selecting pulldown box 1706. Alternatively, the user may choose to link to media content that has earlier been designated as a favorite by the user by selecting pulldown box 1708. In one embodiment, those video or audio files in the user's stash or favorites that are in a valid video or audio format for the showcase page will then be displayed to the user and the user may select one of these to populate the selected slot on template preview area 1704. The user may also be presented with a "blank" selection in both pulldown box 1706 and pulldown box 1708. When "blank" is selected, any media content that is currently populating the selected slot will be cleared and the slot will be blank again.

The user may choose an image from their stash or from images provided by the website to represent the piece of content in the selected slot on the user showcase page. Pulldown box 1710 allows the user to select images saved in the user's stash, while pulldown box 1712 allows the user to select website images. Only display files in the stash that are in valid photo format for the user showcase page may be displayed to the user for selection. In some embodiments, this functionality may not be available for links, (i.e., the user may not associate an image with a link within a slot). Once a slot has been populated, the preview image will reflect that the slot has been filled. Alternatively, the user may populate a slot with linked text (i.e., text promotes) which may be selected by the user to link to particular media content. For example, the slot numbered 7–16 in template preview area 1704 may be populated with 10 separate text promotes to 10 separate items of audio and video media content.

Free text entry box 1714 allows the user to enter a title for the piece of content populating the selected slot. In one embodiment, the user may be limited to a maximum number of characters. This title may appear adjacent to the image or text associated with the media content on the user showcase page. The title may also be used as part of a sorting key for searching among user showcase pages (i.e., as meta-data).

Once the user has populated the desired slot and entered and/or selected the desired information, the user may select the "Add" user-selectable operator 1716. The add user-selectable operator 1716 may add the selected piece of media content to the user showcase page along with its associated meta-data. The selected slot within the preview image may be temporarily populated with the image or link selected, and information about the user showcase page may be temporarily stored. Also, in some embodiments, at this time, any link to a favorite may be verified as an active link on the website. If inactive, an error message may be presented to the user.

The user may repeat the above-described steps for all the slots in the template preview area 1704. When the user has filled all the desired slots with media content, the user may select the "done" user-selectable operator 1720. When the done user-selectable operator 1720 is selected, the user showcase page is updated with the media content and information entered by the user on the showcase manager page 1700.

Figure 18:
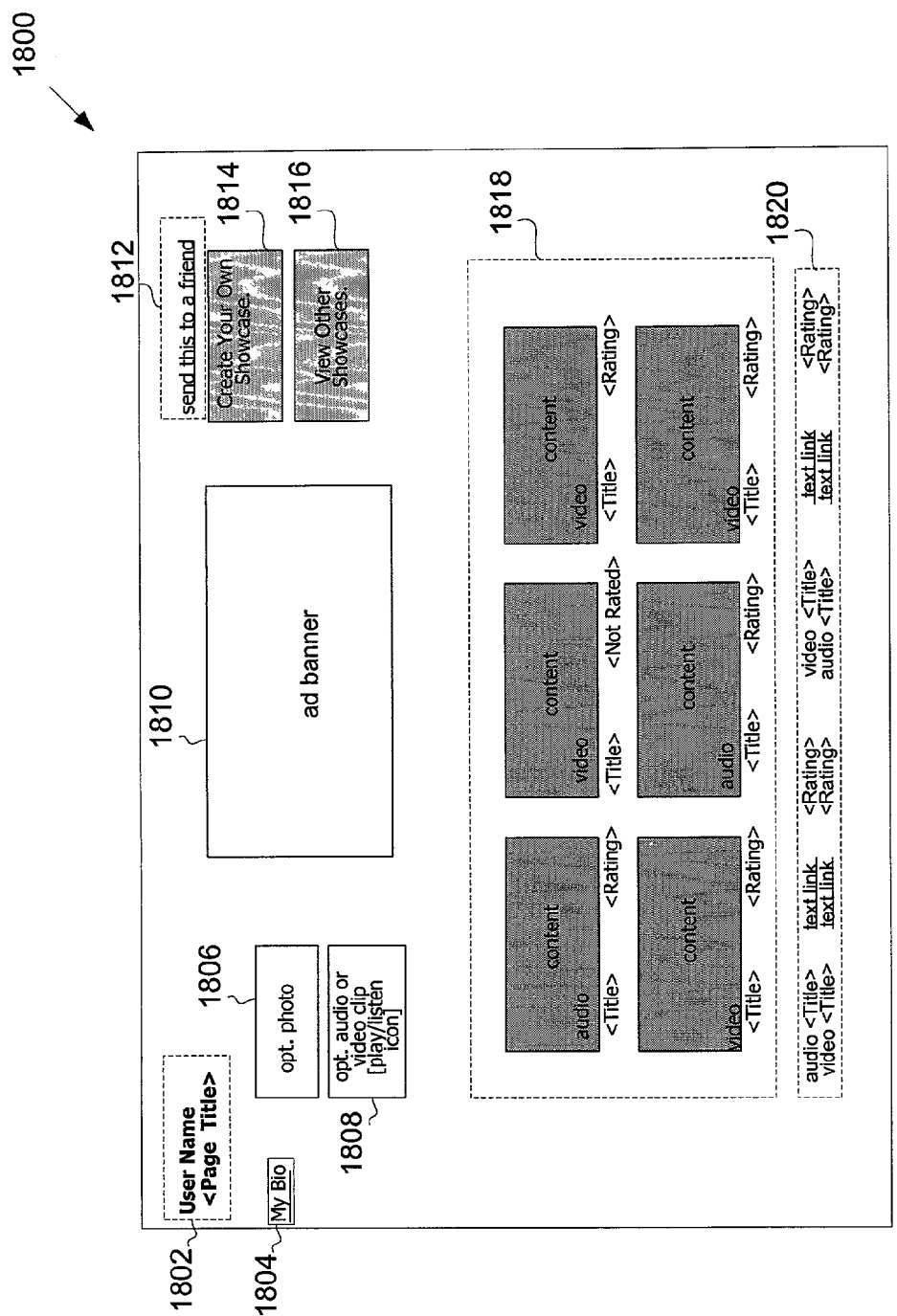
FIG. 18 illustrates an exemplary "User Showcase" page, according to an embodiment of the invention.

FIG. 18 shows an exemplary user showcase page 1800. User showcase page 1800 may be accessed by, for example, selecting a "Showcase Page Link" on a user bio page, selecting a "Showcase Page Link" from search results, selecting a "Showcase Page Link" from graphical guide results, or entering in the Web browser the URL for the website, along with the user name, for example, "www.website.com/USERNAME."

The user's user name may appear in static text area 1802 of user showcase page 1800. In some embodiments, the user name is selected by the user at registration. The user showcase page title is also displayed in static text area 1802. The user showcase page title may be entered by the user in free text entry box 1608 on manage user showcase page 1600, as described above in relation to FIG. 16. In some embodiments, if the user did not enter a name for their user showcase page, a default such as "Showcase" may be displayed. "Edit bio" link 1804 may link the user to a user settings page which may contain an "Edit Bio" tab. The user may then select the tab to link to the user's bio page for editing.

Display area 1806 may optionally display a user selected photo if the user selected a photo to display via pulldown box 1610 on manage user showcase page 1600. Similarly, display area 1808 may optionally be populated with an audio or video clip that may have been selected by the user via pulldown box 1612 on manage user showcase page 1600. If the media content is audio, a user-selectable operator, such as, but not limited to, a clickable "listen" icon may launch an audio popper that will play the audio file. Similarly, if the media content is video, a user-selectable operator, such as, but not limited to, a clickable "play" icon may launch a video popper that will play the video file.

In some embodiments, user showcase page 1800 may include advertisement banner 1810, which may be programmed by website administrators to comprise elements, including, but not limited to, advertising slogans, user-selectable URL links for advertisers' websites, and product images. In addition, the "Send this to a friend" user-selectable operator 1812, when selected, may send a link to the current user showcase page to a recipient via e-mail.

The "Create Your Own Showcase" user-selectable operator 1814 may, when selected, link another user that has accessed exemplary user showcase page 1800 (i.e., not the creator of the current user showcase page 1800) to a manage user showcase page 1600 in order to create their own user showcase page. In embodiments where log in is required to create user showcase pages, selecting this operator may first launch a user log in page so that the user may log in before creating their user showcase page.

The "view other showcases" user-selectable operator 1816 may, when selected, link the user to a portion of the website graphical guide which may, in some embodiments, display to the user a listing of user showcase pages on the website. The user showcase pages may be listed by title, genre, feature type, or other meta-data. The user may then navigate through the guide listing and select the desired user showcase page. That user showcase page may then be launched by the website.

Graphic promotes area 1818 are populated with links to media content such as, but not limited to, promote links which contain a user-selectable representation of the media content. These promotes were configured and populated by the user with links to media content in the steps described above in relation to showcase manager page 1700. Each promote within graphic promotes area 1818 may be designated as either audio or video based on the file format, as shown in FIG. 18. For example, if the file is an ".aif," ".wav," ".au," or ".ra," an audio designation will be displayed. Similarly, if the file is an ".rm," ".asf," or ".swf," a video designation will be displayed. These designations may be static text and may have no functionality in some embodiments.

The number of graphic promotes displayed on exemplary user showcase page 1800 may be determined by the template selection step described above in relation to manage user showcase page 1600. Each promote within graphic promotes area 1818 may be selectable by the user and may be linked to a media player for playing the media content in a user-perceptible form. When selected, the promote launches the appropriate popper (for example, an audio and/or video media player pop-up window) to play the media content associated with the selected promote.

In one embodiment, beneath each promote within graphic promotes area 1818 is a static text area which comprises the title and a rating of the media content associated with that promote. Neither the title nor the rating shown beneath graphic promotes area 1818 has any functionality on exemplary user showcase page 1800 (i.e., they are just static text).

The title may be the title that was entered by the user in free text entry box 1714 on showcase manager page 1700. In some embodiments, users of the website may rate media content that they have experienced via the user showcase pages. An audio or video popper which may be launched by selecting a promote on the user showcase page may play media content associated with that promote. The popper may contain rating functionality (for example, user-selectable operators or free text entry boxes). Through this rating functionality, the user may be given the opportunity to rate media content associated with a particular promote. In this embodiment, an average rating may be displayed on a user showcase page, as shown in the static text area beneath each promote in graphic promotes area 1818.

As discussed above, in addition to graphic promotes, the user may configure the user showcase page to contain text promotes that provide a link to media content. An example of this is shown in text promote area 1820. As with the graphic promotes described above, each text promote is designated as audio or video. This designation, as well as the title and rating adjacent to the text promotes, are static and provide no functionality. The text promote itself, when selected, launches the appropriate popper—either audio or video, depending on file type. The number of text promotes is determined by template selection, as described above.

Thus, using the manage user showcase page 1600 and showcase manager page 1700, the user may configure a user showcase page like exemplary user showcase page 1800 to display the user's media creations. Website administrators may periodically view user showcase pages looking for particularly compelling user-created media content. When such media content is found, the user's media content may be ingested into the home page (or other website pages) to be displayed side by side with media content that may have been licensed from professional media artists such as musicians, directors, and photographers.

Thus, it can be seen that embodiments of the broadband creativity platform for creating, editing, sharing, and publishing of media content described above allow the user to create and edit media content using digital assets and media content creation and editing tools provided by the platform. Furthermore, it can be seen then that embodiments of the broadband creativity platform for creating, editing, sharing, and publishing of media content described above allow users to display their media content to a wider audience. In addition, it can be seen that embodiments of the broadband creativity platform for creating, editing, sharing, and publishing of media content described above may allow the user to share media content with other users of the broadband creativity platform. In addition, it can be seen then that embodiments of the broadband creativity platform for creating, editing, sharing, and publishing of media content described above may allow the user to display the user's media content side by side with media content created by professional creators of media content.

The embodiments of the broadband creativity platform described above focus on implementations for a network server computer system accessible through the World Wide Web and the Internet as a website (referred to as the "website"). However, many or all of the systems and processes described may be readily adapted to other data connections as well, including, but not limited to, other Internet connection interfaces (for example, an FTP server), private networks (for example, a network provided by an ISP for its subscribers), and direct connections (such as a directly wired set of stations in a limited area such as a hotel, office building, educational facility or the like).

In addition, implementations are described in which the user accesses the website, creates and edits media content, and downloads electronic files using a computer system, which may be a personal computer system or other suitable computer system. However, many or all of the systems and processes described may be readily adapted to other UNDs employed to access and download data through a server, including, but not limited to, a television with a connected or internal cable modem and hard disk, personal digital assistants (PDAs), media players, mobile telephone devices, or any other suitable network enabled device with a storage device for storing content and/or display mechanism for playing or displaying media content to the user.

Various embodiments of the present invention may include one or more of the features and functions described above. One example embodiment includes all the features and functions described above.

Therefore, a media content creating and publishing system and process has been described. In one embodiment, a broadband creativity platform website is described which provides creating and editing tools that the user may access on-line or download in order to create and edit their own media content. The user may then display their media content to other users of the website.

In one embodiment, the website displays to the user a number of web pages and other programmed elements which facilitate the media content creating and publishing process by allowing the user to create and edit media content, store and manage the media content in a user storage area, and configure and populate "user showcase pages" to display the user's media content, as well as media content provided by the website. Other users of the website may view the user showcase pages. Additionally, users of the website may share media content files with one another through a "manage share page."

These and other objects, features, and advantages of embodiments of the invention will be apparent to those skilled in the art from the foregoing detailed description of embodiments of the invention, when read with the drawings and appended claims. It is to be understood that even though numerous characteristics and advantages of embodiments of the present invention have been set forth in the foregoing description, together with details of the structure and function of embodiments of the invention, this disclosure is illustrative only. Changes may be made in detail, especially matters of structure and management of parts within the principles of the present invention to the full extent indicated by the broad general meaning of the terms in which the appended claims are expressed.

Having disclosed exemplary embodiments and the best mode, modifications and variations may be made to the disclosed embodiments while remaining within the scope of the invention as defined by the following claims.

What is claimed is:

1. A user interface for use with a broadband creativity platform system, comprising:
   at least one media creating and editing tool for enabling a first user to create a plurality of personalized media content items;
   a storage device for storing said plurality of personalized media content items;
   a first user-selectable operator for selecting ones of said stored personalized media content item;
   a graphic display having a display area including a plurality of sub-areas for association with said selected ones of said personalized media content items;
   a second user-selectable operator, cooperatively operated with said first user-selectable operator and positioned on said plurality of sub-areas for populating the sub-areas of the display area with links to said selected ones of said stored plurality of personalized media content items;
   wherein the links populated in said display area may be activated by a third user-selectable operators, which, when selected by the operator, link said selected ones of said stored plurality of personalized media content items to a media player programmed for playing the selected ones of said plurality of personalized media content items in user-perceptible form.

2. The user interface recited in claim 1, further comprising:
   at least one server network device, the at least one server network device being programmed to provide the user interface; and
   at least one user network device communicatively coupled to the server network device via a network, the at least one user network device being programmed to access the user interface.

3. The user interface recited in claim 2, wherein the network comprises the Internet and the user interface comprises a website.

4. The user interface recited in claim 1, wherein the personalized media content items comprises at least one of a media content item created by the first user and a media content edited by the first user.

5. The user interface recited in claim 1, further comprising a plurality of website pages for performing at least one of facilitating downloading of media content items, facilitating downloading of media content creating and editing tools, and facilitating downloading of digital asset packs.

6. The user interface recited in claim 5, further comprising a user-selectable operator for sending a media content item via e-mail.

7. The user interface recited in claim 5, further comprising at least one user-selectable feature link for linking the user to at least one of related pages, related poppers, or related websites.

8. The user interface recited in claim 5, wherein the plurality of website pages further comprise genre pages, genre zone pages, media content creating and editing tool pages, media content tool and asset pack download pages, showcase pages, manage showcase pages, share pages, and manage share pages.

9. The user interface recited in claim 5, further comprising a plurality of user-selectable operators for at least one of moving between the plurality of website pages, choosing an "experience" option, choosing a "create" option, choosing a "connect" option, choosing a "favorites" option, choosing a "log in" option, choosing a "search" option, choosing a "graphical guide" option, choosing a "settings" option, choosing an "about" option, choosing a "shop" option, and choosing a "help" option.

10. The user interface recited in claim 9, wherein the user-selectable operator for choosing an "experience" option further comprises user-selectable operators for choosing at least one of an "action" genre option, a "comedy" genre option, a "drama" genre option, a "music" genre option, and a "science fiction" genre option.

11. The user interface recited in claim 10, wherein the user-selectable operators for choosing at least one of an "action" genre option, a "comedy" genre option, a "drama" genre option, a "music" genre option, and a "science fiction" genre option each further comprise user-selectable operators for choosing a genre "zone" page.

12. The user interface recited in claim 1, further comprising a plurality of website pages for performing at least one of facilitating creating and editing of the media content items, facilitating uploading of the media content items, facilitating storing and managing of the media content items, facilitating display of the media content items, facilitating searching of the media content items, facilitating browsing of the media content items, and facilitating sharing of the media content items.

13. The user interface recited in claim 12, wherein the at least one promotional area is located on a user showcase page associated with the first user.

14. The user interface recited in claim 13, wherein the user showcase page associated with the first user is accessible to the second user.

15. The user interface recited in claim 1, wherein the media player comprises a pop-up window for playing the media content item.

16. The user interface recited in claim 1, wherein the at least one user-selectable operator comprises a user-selectable promote image.

17. The user interface recited in claim 1, wherein the at least one user-selectable operator comprises a user-selectable text link.

18. The user interface recited in claim 1, further comprising at least one display area for displaying a user-selected photo.

19. The user interface recited in claim 1, further comprising at least one display area for displaying at least one of a user-selected audio clip and a user-selected video clip.

20. The user interface recited in claim 1, further comprising at least one display area for displaying an advertisement.

21. The user interface recited in claim 1, wherein the at least one media creating and editing tool allows the first user to create the personalized media content items off-line.

22. The user interface recited in claim 1, wherein the at least one media creating and editing tool allows the first user to create the personalized media content items on-line.

23. The user interface recited in claim 1, wherein the personalized media content items comprises audio and video content items.

24. The user interface recited in claim 23, wherein the first user incorporates a media segment into personalized media content items.

25. The user interface recited in claim 1, wherein the personalized media content items include elements not previously created.

26. The user interface recited in claim 1, wherein the personalized media content items include elements that are not themselves media content items.

27. The user interface recited in claim 1, wherein the personalized media content items include at least one element that is not itself a media content item.

28. The user interface recited in claim 1, wherein the personalized media content items is not a copy of a previously existing content item.

29. The user interface recited in claim 1, wherein at least some of the personalized media content items are different from any previously existing content item.

30. The user interface recited in claim 1, wherein at least one of said personalized media content items is an original work of art.

31. The user interface recited in claim 1, wherein at least one of said personalized media content items is a first original having no pre-existing identical content.

32. A system for enabling a user to publish a personalized media content item on a user interface, the system comprising:
- at least one server network device communicatively coupled to at least one user network device via a network, the at least one server network device being programmed to provide the user interface and the at least one user network device being programmed to access the user interface;
- at least one media creating and editing tool for use by the user in creating a plurality of personalized media content items;
- a storage device for storing the plurality of personalized media content items;
- a first template, the first template comprising a first plurality of slots, each of said first plurality of slots programmed for receiving a link to at least one of the stored plurality of personalized media content items; and
- at least one user-selectable operator programmed for enabling the user to populate the first plurality of slots so that each slot is populated by at least one of a plurality of links to link to at least one of the stored plurality of personalized media content items, said first plurality of populated slots defining a first area on a user showcase display page corresponding to a first plurality of stored personalized media content items;
- a second template, the second template comprising a second plurality of slots, each of said second plurality of slots programmed for receiving a link to at least one of the stored plurality of personalized media content items; and said user-selectable operator programmed for enabling the user to populate the second plurality of slots so that each of the second plurality of slots is populated by at least one of a plurality of links to link to at least one of the stored plurality of personalized media content items, said second plurality of populated slots defining a second area on the user showcase display page corresponding to a second plurality of stored personalized media content items;

wherein each of said first and second user areas is selectable for activating the playing of the corresponding first and second plurality of personalized media content items by at least another user selectable operator in a user-perceptible form.

33. The system recited in claim 32, wherein the network comprises the Internet and the user interface comprises a website.

34. The system recited in claim 33, wherein the at least one server network device is further programmed to display the user showcase display page to a plurality of user network devices communicatively coupled to the server network device via the network.

35. The system recited in claim 32, wherein the each of said personalized media content items comprises at least one of a media content item created by the user and a media content edited by the user.

36. The system recited in claim 32, further comprising a media player programmed for playing ones of the personalized media content items in a user-perceptible form.

37. The system recited in claim 36, wherein the link is user-selectable for linking ones of the media content items to the media player.

38. The system recited in claim 32, wherein the storage device is associated with the server network device.

39. The system recited in claim 32, wherein the at least one user-selectable operator comprises a pulldown box for displaying to the user a list of personalized media content items stored on the storage device and enabling the user to select ones of said personalized media content items from the list and to populate the at least one slot with a link to the selected ones of said personalized media content items.

40. The system recited in claim 32, wherein the link comprises a user-selectable promote image.

41. The system recited in claim 40, wherein the user-selectable promote image comprises a digital photo.

42. The system recited in claim 40, wherein the user-selectable promote image comprises a graphic image.

43. The system recited in claim 40, further comprising a user-selectable operator for selecting the user-selectable promote image from a list of images.

44. The system recited in claim 43, wherein user-selectable operator for selecting the user-selectable promote image comprises a pulldown box for displaying to the user a list of images and enabling the user to select an image from the list and to populate the at least one slot with the selected image.

45. The system recited in claim 32, wherein the link comprises user-selectable text.

46. The system recited in claim 32, further comprising a free text entry box for entering information about the personalized media content items.

47. The system recited in claim 46, wherein the information comprises the name of the personalized media content items.

48. A publishing system including a user interface, comprising:
at least one server network device, the at least one server network device being programmed to provide the user interface; and
at least one user network device communicatively coupled to the server network device via a network, the at least one user network device being programmed to access the user interface, said network device communicatively coupled to a first and second user;
said user interface comprising:
a plurality of digital assets, the plurality of digital assets being accessible to a user for incorporation into a media content item;
at least one media creating and editing tool, the at least one media creating and editing tool being accessible to a user for incorporating at least one of the plurality of digital assets into the media content item, so that the media content item becomes a personalized media content item;
a storage area for storing the personalized media content item; and
a first user-selectable operator for selecting ones of said stored personalized media content items;
a graphic display having a display area including a plurality of sub-areas for association with said selected ones of said personalized media content items;
a second user-selectable operator, cooperatively operated with said first user-selectable operator and positioned on said plurality of sub-areas for populating the sub-areas of the display area with links to said selected ones of said stored plurality of personalized media content items;
wherein the links populated in said display area may be activated by a third user-selectable operators, which, when selected by the operator, link said selected ones of said stored plurality of personalized media content items to a media player programmed for playing the selected ones of said plurality of personalized media content items in user-perceptible form;
wherein said first user creates, stores and displays the personalized media content item and said second user, different from said first user, is enabled to play the personalized media content item through said network device in a user-perceptible form by actuation of said third user selectable operator.

49. The user interface recited in claim 48, wherein the plurality of digital assets comprise at least one of digital video, digital audio, digital photos, digital graphics, digital text and digital animation.

50. The user interface recited in claim 48, wherein the plurality of digital assets comprise asset packs.

51. The user interface recited in claim 48, wherein the at least one media creating and editing tool comprises on-line media content creating and editing software.

52. The user interface recited in claim 51, wherein the on-line media content creating and editing software runs in a tool popper window.

53. The user interface recited in claim 48, wherein the network comprises the Internet and the user interface comprises a website.

54. The user interface recited in claim 53, wherein the display area comprises a website showcase page.

55. The user interface recited in claim 53, further comprising a plurality of tool application website pages for creating and editing media content.

56. The user interface recited in claim 55, wherein at least one of the plurality of tool application website pages comprises at least one of a pre-defined template and a timeline.

57. The user interface recited in claim 56, wherein the timeline comprises media content containers populated by the user with media content segments.

58. The user interface recited in claim 57, wherein the media content segments are video segments.

59. The user interface recited in claim 57, wherein the media content segments are audio segments.

60. The user interface recited in claim 53, further comprising a download tool page for downloading to the user network device at least one of media creating and editing tools and digital assets.

61. The user interface recited in claim 60, wherein the download tool page comprises a digital asset and media creating and editing tool list for listing digital assets and media creating and editing tools available to the user for download.

62. The user interface recited in claim 61, wherein the download tool page further comprises user-selectable tabs for providing information about at least one of the digital assets and the media creating and editing tools.

63. The user interface recited in claim 62, wherein the information comprises at least one of a listing of contents, a description, a credit, a summary, a copyright notice, and a tutorial.

64. The user interface recited in claim 60, wherein the download tool page further comprises a "download all" operator for downloading at least one of all digital assets and all media creating and editing tools.

65. The user interface recited in claim 60, wherein the download tool page further comprises a "preview all" operator for previewing at least one of all digital assets and all media creating and editing tools.

66. The user interface recited in claim 65, wherein at least one of all digital assets and all media creating and editing tools are previewed within a media popper.

67. The user interface recited in claim 60, wherein the download tool page further comprises a "related links" section for linking the user to related areas of the website.

68. The user interface recited in claim 67, wherein the related links section comprises at least one of an "experience related link," a "create related link," a "connect related link," and a "buy related link."

69. An electronic media content creating and publishing process, comprising:
   creating and editing a plurality of personalized media content items utilizing at least one media creating and editing tool operated by a first user;
   storing said plurality of personalized media content items in a storage device;
   selecting, using a first user-selectable operator ones of said stored personalized media content items;
   providing a graphic display having a display area including a plurality of sub-areas for association with said selected ones of said personalized media content items;
   providing a second user-selectable operator, cooperatively operated with said first user-selectable operator and positioned on said plurality of sub-areas, and populating the sub-areas of the display area with links to said selected ones of said stored plurality of personalized media content items;
   activating by a third user-selectable operator the links populated in said display area, which, when selected by the operator, link said selected ones of said stored plurality of personalized media content items to a media player programmed for playing the selected ones of said plurality of personalized media content items in user-perceptible form;
   providing a showcase page creating tool to enable said first user to create a showcase display page serving as an interface accessible by a second user, remote from said first user, said showcase display page containing said third user-selectable operator and links populated in said display area;
   displaying said showcase display page to said second user;
   wherein said second user, upon selection of said third user selectable operator, activates links to said selected ones of said personalized media content items for playing said selected ones of said personalized media content items in a form perceptible to said second user.

70. The electronic media content creating and publishing process recited in claim 69, wherein said creating and editing step includes providing media creating and editing tools to the first user to enable the first user to access the media creating and editing tools on website pages displayed to the first user.

71. The electronic media content creating and publishing process recited in claim 69, wherein storing the first user's personalized media content items comprises storing the first user's personalized media content items in a storage device associated with a website.

72. The electronic media content creating and publishing process recited in claim 69, wherein said showplace display page is displayed on a web site.

73. The electronic media content creating and publishing process recited in claim 69, wherein storing the first user's personalized media content items comprises providing the first user with a "manage storage space" website page to which the user uploads and stores the user's personalized media content items.

74. The electronic media content creating and publishing process recited in claim 73, wherein providing the first user with a "manage storage space" website page from which the first user may upload the first user's personalized media content items further comprises providing the first user with an "upload" user-selectable operator on the "manage storage space" website page for uploading a media content file selected from a directory listing of media content files.

75. The electronic media content creating and publishing process recited in claim 74, wherein uploading a media content file selected from a directory listing of media content files further comprises entering information about the media content file to be uploaded.

76. The electronic media content creating and publishing process recited in claim 75, wherein entering information about the media content file to be uploaded further comprises entering at least one of information about the author of the media content, information describing the media content, searchable keywords within the media content, feature type of the media content, feature sub-type of the media content, genre of the media content, and sub-genre of the media content.

77. The electronic media content creating and publishing process recited in claim 69, wherein said creating and editing step includes supplying digital assets to said first user to enable said first user to access the digital assets on a website through website pages displayed to the first user.

78. The electronic media content creating and publishing process recited in claim 69, further comprising providing access to the first user's personalized media content items on a website using a "share manager" page and displaying a directory list of media content files designated as "shared."

79. The electronic media content creating and publishing process recited in claim 78, wherein providing access to the first user's personalized media content items on a website "share manager" page further comprises providing "download" user-selectable operators associated with the listed media content files, the "download" user-selectable operators being selectable for initiating downloading of a media content file associated with the "download" user-selectable operator.

80. The electronic media content creating and publishing process recited in claim 79, wherein initiating downloading of a media content file associated with the "download" user-selectable operator comprises downloading the media content file to a user network device of the second user.

81. A process for enabling a user to publish a media content item on a user interface, the process comprising:
   supplying to the user at least one media creating and editing tool for use by the user in creating a plurality of personalized media content items;
   providing to the user a storage area for storing the plurality of personalized media content items;
   displaying to the user a first template, the first template comprising a first plurality of slots, each slot of said first plurality of slots programmed for receiving a link to the at least one of a first plurality of stored personalized media content items; and
   displaying to the user a second template, the second template comprising a second plurality of slots, each slot of said second plurality of slots programmed for receiving a link to the at least one of a second plurality of stored personalized media content items; and
   providing to the user at least one user-selectable operator programmed for enabling the user to populate the first and second plurality of slots, each with a corresponding link to one of said first and second plurality of personalized media content items;
   providing a user showcase display page having a first and second display area corresponding respectively to said first and second plurality of slots;
   selecting from said user showcase display page at least one of said first and second display areas to activate a link to at least one of said corresponding first and second plurality of personalized media content items for activating the playing of the selected plurality of personalized media content items in a user-perceptible form.

82. The process recited in claim 81, wherein the user interface comprises an Internet website.

83. The process recited in claim 82, wherein said user showcase display page further comprising at least one promotional area.

84. The process recited in claim 82, wherein providing said user showcase display page includes displaying said user showcase display page to a plurality of users of the website.

85. A computer readable program stored on a storage medium which, when executed on said computer causes said computer to perform the steps of:
   creating and editing a plurality of personalized media content items utilizing at least one media creating and editing tool operated by a first user;
   storing said plurality of personalized media content items in a storage device;
   selecting, using a first user-selectable operator ones of said stored personalized media content items;
   providing a graphic display having a display area including a plurality of sub-areas for association with said selected ones of said personalized media content items;
   providing a second user-selectable operator, cooperatively operated with said first user-selectable operator and positioned on said plurality of sub-areas, and populating the sub-areas of the display area with links to said selected ones of said stored plurality of personalized media content items;
   activating by a third user-selectable operator the links populated in said display area, which, when selected by the operator, link said selected ones of said stored plurality of personalized media content items to a media player programmed for playing the selected ones of said plurality of personalized media content items in user-perceptible form;
   providing a showcase page creating tool to enable said first user to create a showcase display page serving as an interface accessible by a second user, remote from said first user, said showcase display page containing said third user-selectable operator and links populated in said display area;
   displaying said showcase display page to said second user;
   wherein said second user, upon selection of said third user selectable operator, activates links to said selected ones of said personalized media content items for playing said selected ones of said personalized media content items in a form perceptible to said second user.

86. The computer readable program as recited in claim 85, wherein said creating and editing step includes providing media creating and editing tools to the first user to enable the first user to access the media creating and editing tools on website pages displayed to the first user.

87. The computer readable program as recited in claim 86, wherein said creating and editing step includes incorporating downloaded digital assets into media content utilizing downloaded media creating and editing tools.

88. A user interface for use with a broadband creativity platform system, comprising:
   means for enabling a first user to create a personalized media content items;
   means for storing said plurality of personalized media content items;
   means, utilizing a first user-selectable operator, for selecting ones of said stored personalized media content items;
   means for displaying a graphic display having a display area including a plurality of sub-areas for association with said plurality selected ones of said personalized media content items;
   means, utilizing a second user-selectable operator, cooperatively operated with said first user-selectable operator and positioned on said plurality of sub-areas, for populating the sub-areas of the display area with links to said selected ones of said stored plurality of personalized media content items;
   means, utilizing a third user selectable operator, for activating the links populated in said display area, which, when selected by the operator, link said selected ones of said stored plurality of personalized media content items to a media player programmed for playing the selected ones of said plurality of personalized media content items in user-perceptible form.

89. The user interface recited in claim 88, further comprising:
- means for providing at least one server network device, the at least one server network device being programmed to provide the user interface; and
- means for providing at least one user network device communicatively coupled to the server network device via a network, the at least one user network device being programmed to access the user interface.

90. The user interface recited in claim 89, wherein the network comprises the Internet and the user interface comprises a website.

91. The user interface recited in claim 88, wherein the personalized media content items comprises at least one of a media content item created by the first user and a media content edited by the first user.

92. The user interface recited in claim 88, further comprising means for performing at least one of facilitating downloading of at least some of said personalized media content items, facilitating downloading of media content creating and editing tools, and facilitating downloading of digital asset packs.

93. The user interface recited in claim 92, further comprising means for sending personalized media content items via e-mail.

94. The user interface recited in claim 92, further means for linking the user to at least one of related pages, related poppers, or related websites.

95. The user interface recited in claim 88, further comprising means for performing at least one of facilitating creating and editing of the media content items, facilitating uploading of at least some of said personalized media content items, facilitating managing of the personalized media content items, facilitating display of the personalized media content items, facilitating searching of the personalized media content items, facilitating browsing of the personalized media content items, and facilitating sharing of the personalized media content items.

\* \* \* \* \*